United States Patent
Moradi et al.

(10) Patent No.: US 11,291,020 B2
(45) Date of Patent: Mar. 29, 2022

(54) SPREAD SPECTRUM SCHEDULING REQUESTS FOR WIRELESS COMMUNICATION RESOURCE

(71) Applicant: Hussein Moradi, Idaho Falls, ID (US)

(72) Inventors: Hussein Moradi, Idaho Falls, ID (US); Behrouz Farhang, Salt Lake City, UT (US)

( * ) Notice: Subject to any disclaimer, the term of this patent is extended or adjusted under 35 U.S.C. 154(b) by 35 days.

(21) Appl. No.: 16/846,239

(22) Filed: Apr. 10, 2020

(65) Prior Publication Data
US 2020/0329482 A1 Oct. 15, 2020

Related U.S. Application Data
(60) Provisional application No. 62/831,808, filed on Apr. 10, 2019.

(51) Int. Cl.
| | |
|---|---|
| H04W 4/00 | (2018.01) |
| H04W 72/12 | (2009.01) |
| H04B 1/69 | (2011.01) |

(52) U.S. Cl.
CPC .............. *H04W 72/12* (2013.01); *H04B 1/69* (2013.01)

(58) Field of Classification Search
CPC ... H04W 28/04; H04W 72/04; H04W 72/042; H04W 88/08; H04W 72/12; H04W 72/1284; H04L 5/0007; H04B 1/69; H04B 1/7103; H04J 13/0062; H04J 13/0048
See application file for complete search history.

(56) References Cited

U.S. PATENT DOCUMENTS

| | | | | |
|---|---|---|---|---|
| 6,359,923 B1 * | 3/2002 | Agee | ........................ | H04B 1/69 370/342 |
| 6,501,788 B1 * | 12/2002 | Wang | ................... | H04B 1/7103 375/148 |
| 6,574,270 B1 * | 6/2003 | Madkour | ........... | H04B 1/71072 375/144 |
| 8,295,395 B2 * | 10/2012 | Mueck | ................... | H04B 15/00 375/296 |
| 10,420,132 B2 | 9/2019 | Moradi et al. | | |
| 2009/0129331 A1 * | 5/2009 | Wu | ..................... | H04W 72/082 370/330 |

(Continued)

OTHER PUBLICATIONS

ETSI TS 138 211 V15.2.0 (Jul. 2018), "5G; NR; Physical channels and modulation", (3GPP TS 38.211 version 12.2.0 Release 15), pp. 1-98.

(Continued)

*Primary Examiner* — Phuongchau Ba Nguyen
(74) *Attorney, Agent, or Firm* — Kunzler Bean & Adamson, PC

(57) ABSTRACT

Apparatuses, systems and methods are disclosed for wireless communication. A base station may communicate with a plurality of user equipments (UEs) without allocating spectral resources to the UEs for communicating scheduling requests. The base station may detect a scheduling request from a requesting UE of the plurality of UEs. The scheduling request may include a spread spectrum signal based on a spreading sequence. The scheduling request may indicate an identity for a requesting UE without indicating information other than the identity. The base station may grant spectral resources to the requesting UE in response to detecting a scheduling request.

13 Claims, 12 Drawing Sheets

(56) References Cited

U.S. PATENT DOCUMENTS

| | | | |
|---|---|---|---|
| 2018/0049230 A1* | 2/2018 | Moradi | H04W 72/1231 |
| 2018/0279324 A1* | 9/2018 | Wang | H04L 1/18 |
| 2019/0173545 A1* | 6/2019 | Grybos | H04B 7/0617 |
| 2019/0268918 A1* | 8/2019 | Baghel | H04W 72/0406 |

OTHER PUBLICATIONS

ETSI TS 138 212 V15.2.0 (Jul. 2018), "5G; NR, Multiplexing and channel coding", (3GPP TS 38.212 version 12.2.0 Release 15), pp. 1-101.

ETSI TS 138 213 V15.3.0 (Oct. 2018), "5G; NR; Physical layer procedures for control", (3GPP TS 38.213 version 15.3.0 Release 15), pp. 1-102.

ETSI TS 138 321 V15.2.0 (Sep. 2018), "5G; NR; Medium Access Control (MAC) protocol specification", (3GPP TS 38.321 version 12.2.0 Release 15), pp. 1-74.

* cited by examiner

700

| UE # | $\Delta_1$ | $\Delta_2$ | UE # | $\Delta_1$ | $\Delta_2$ | UE # | $\Delta_1$ | $\Delta_2$ | UE # | $\Delta_1$ | $\Delta_2$ |
|---|---|---|---|---|---|---|---|---|---|---|---|
| 1 | 0 | 1000 | 11 | 200 | 1000 | 21 | 400 | 1000 | 31 | 600 | 1000 |
| 2 | 100 | 1100 | 12 | 300 | 1100 | 22 | 500 | 1100 | 32 | 700 | 1100 |
| 3 | 200 | 1200 | 13 | 400 | 1200 | 23 | 600 | 1200 | 33 | 800 | 1200 |
| 4 | 300 | 1300 | 14 | 500 | 1300 | 24 | 700 | 1300 | 34 | 900 | 1300 |
| 5 | 400 | 1400 | 15 | 600 | 1400 | 25 | 800 | 1400 | 35 | 0 | 1400 |
| 6 | 500 | 1500 | 16 | 700 | 1500 | 26 | 900 | 1500 | 36 | 100 | 1500 |
| 7 | 600 | 1600 | 17 | 800 | 1600 | 27 | 0 | 1600 | 37 | 200 | 1600 |
| 8 | 700 | 1700 | 18 | 900 | 1700 | 28 | 100 | 1700 | 38 | 300 | 1700 |
| 9 | 800 | 1800 | 19 | 0 | 1800 | 29 | 200 | 1800 | 39 | 400 | 1800 |
| 10 | 900 | 1900 | 20 | 100 | 1900 | 30 | 300 | 1900 | 40 | 500 | 1900 |

SPREAD SPECTRUM SCHEDULING REQUESTS FOR WIRELESS COMMUNICATION RESOURCE

CROSS-REFERENCES TO RELATED APPLICATIONS

This application claims the benefit of U.S. Provisional Patent Application No. 62/831,808 entitled "DEVICES, BASE STATIONS, AND METHODS FOR SIGNAL SYNTHESIS AND INTERFERENCE SUPPRESSION IN A SPREAD SPECTRUM SYSTEM" and filed on Apr. 10, 2019 for Hussein Moradi et al., which is incorporated herein by reference.

STATEMENT REGARDING FEDERALLY SPONSORED RESEARCH OR DEVELOPMENT

This invention was made with Government support under Prime Contract No. DE-AC07-051D14517 awarded by the Department of Energy. The Government has certain rights in this invention.

FIELD

This invention relates to signal processing and more particularly relates to scheduling requests sent by wireless user equipment to a wireless base station to request resources.

BACKGROUND

A wireless communication network may include multiple user equipments (UEs) that communicate with a base station. The base station may allocate different spectral resources (e.g., time and/or frequency resources) to different UEs for uplink and/or downlink communication. For downlink communication, the base station may "know" when it has downlink data to transmit to a UE, and may thus be able to efficiently allocate spectral resources and to communicate with low latency. However, for uplink communications, a UE may have data to transmit to the base station before the base station "knows" that uplink resources are needed.

For "grant-free" or "configured grant" uplink transmissions, the base station preallocates uplink resources to UEs. A UE using already-allocated uplink resources may transmit data with low latency. However, scarce spectral resources may be under-utilized when UEs don't have data to transmit. By contrast, for "grant-based" uplink transmissions, the base station grants spectral resources for uplink transmissions to UEs on an as-needed basis. A UE may signal that it needs to send data by transmitting a scheduling request (SR), and the base station may respond by transmitting a grant signal allocating spectral resources to the UE for the data transmission. The grant-based approach may allocate spectral resources more efficiently than the grant-free approach, but may increase latency by the time associated with requesting and allocating the resources.

SUMMARY

Apparatuses are disclosed for wireless communication. An apparatus, in one embodiment, includes a base station. In some embodiments, a base station is configured to communicate with a plurality of user equipments (UEs). In further embodiments, a base station may be configured to communicate with UEs without allocating spectral resources to the UEs for communicating scheduling requests. In some embodiments a base station is configured to detect a scheduling request from a requesting UE of the plurality of UEs. In further embodiments, a scheduling request may include a spread spectrum signal based on a spreading sequence. In various embodiments, a scheduling request may indicate an identity for a requesting UE without indicating information other than the identity. In some embodiments, a base station is configured to grant spectral resources to a requesting UE in response to detecting a scheduling request.

Methods are disclosed for wireless communication. A method, in one embodiment, includes communicating with a plurality of UEs without allocating spectral resources to the UEs for communicating scheduling requests. In some embodiments, a method includes detecting a scheduling request from a requesting UE of the plurality of UEs. In further embodiments, a scheduling request may include a spread spectrum signal based on a spreading sequence. In various embodiments, the scheduling request may indicate an identity for the requesting UE without indicating information other than the identity. In some embodiments, a method includes granting spectral resources to a requesting UE in response to detecting a scheduling request.

An apparatus, in another embodiment, includes means for communicating with a plurality of UEs without allocating spectral resources to the UEs for communicating scheduling requests. In some embodiments, an apparatus includes means for detecting a scheduling request from a requesting UE of the plurality of UEs. In further embodiments, a scheduling request may include a spread spectrum signal based on a spreading sequence. In various embodiments, the scheduling request may indicate an identity for the requesting UE without indicating information other than the identity. In some embodiments, an apparatus includes means for granting spectral resources to a requesting UE in response to detecting a scheduling request.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 depicts one embodiment of a table of cyclic offsets that identify user equipments (UEs);

DETAILED DESCRIPTION

Figure 1:
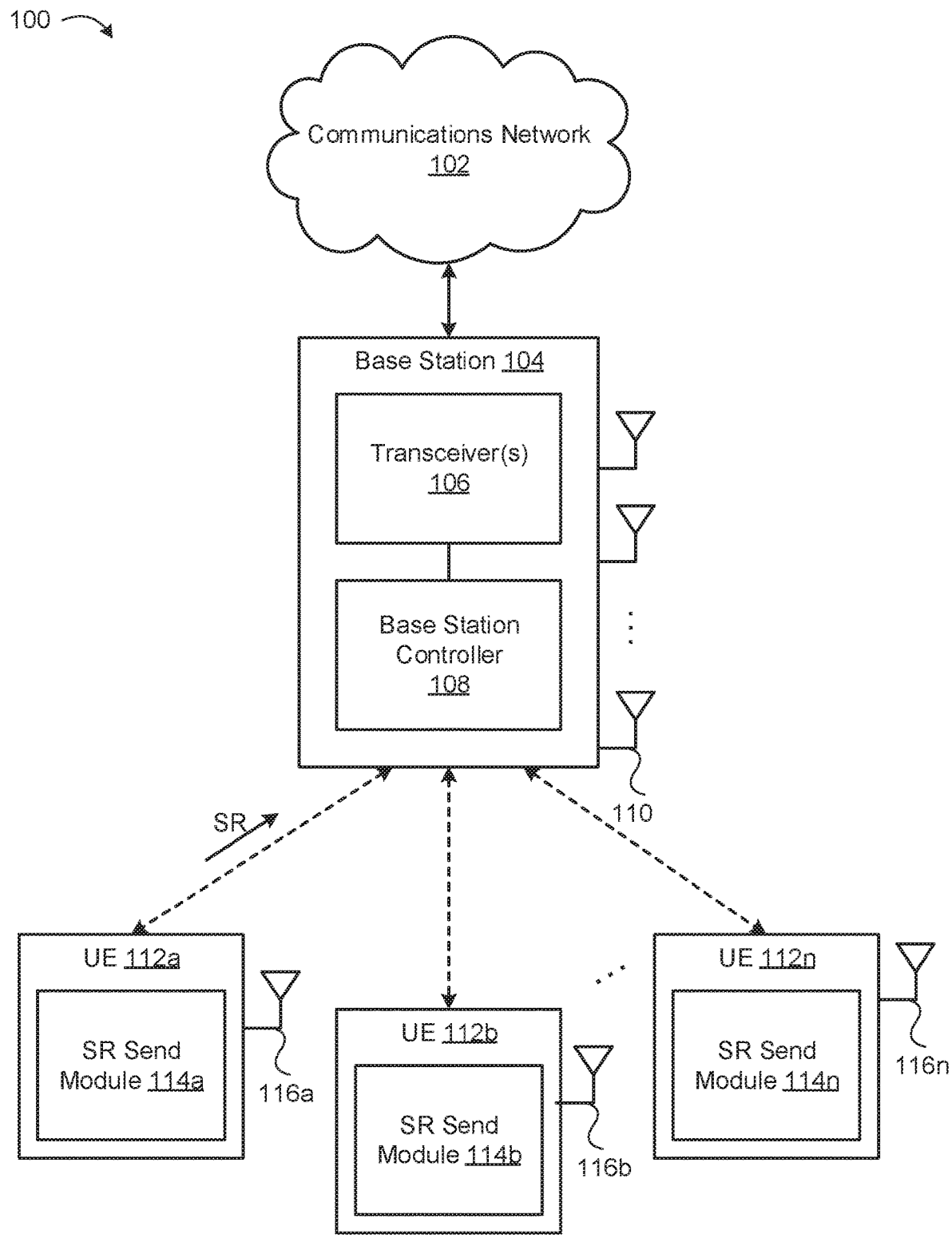
FIG. 1 is a block diagram illustrating one embodiment of a system for wireless communication.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one" of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 is a block diagram illustrating one embodiment of a system 100 for wireless communication. A system 100 for wireless communication may include or implement various apparatuses and methods for wireless communication as disclosed herein. In the depicted embodiment, the system 100 includes a base station 104 and one or more user equipments (UEs) 112. The base station 104 may communicate wirelessly (as indicated by dashed arrows) with the UEs 112, and may be in wired or wireless communication (as indicated by a solid arrow) with a communications network 102. The communications network 102 may be the Internet, or may be another network such as a wide area network, metropolitan area network, campus area network, local area network, virtual private network, or the like. The base station 104 may facilitate communication between the UEs 112 and the communications network 102, or other devices coupled to the communications network 102.

In various embodiments, a base station 104 may be a cell site or cell tower for mobile telephony and/or data, a wireless access point for wireless computer networking (e.g., Wi-Fi or WiMAX), or the like. A base station 104 may be a fixed installation such as a cell tower, or may be transportable (e.g., with components coupled to a van, trailer, or truck) to provide mobile or temporary wireless network capacity for events or emergencies. Various other or further types of base station 104 for various other or further types of wireless communication networks may be included in a wireless communication system 100.

In the depicted embodiment, a base station 104 includes one or more transceivers 106, a base station controller 108, and one or more antennas 110. The transceiver(s) 106 may transmit signals to the UEs 112 and/or receive signals from the UEs 112 via the antenna(s) 110. The base station controller 108 may control and communicate with the transceiver(s) 106 to encode data into signals, decode signals into data, control power levels, control frequency and time allocations or the like. The base station controller 108 may include components to control and communicate with the transceiver(s) 106, and/or to communicate via the network 102 such as network interface controllers, one or more general-purpose processors that execute code stored on a computer-readable storage medium for performing one or more functions of the base station controller 108, one or more special purpose digital signal processors that encode, decode, or otherwise transform data and/or signals, memory and/or storage to store the code executed by a general-purpose processor or a digital signal processor, or the like. Various other or further components of a base station 104 or of a base station controller 108 such as amplifiers, multiplexers, towers for supporting the antennas 110, and the like may be included in a base station 104, but are omitted from FIG. 1 for clarity in depicting other elements of the system 100.

In the depicted embodiment, the system 100 includes one or more user equipments 112a-n. Although three UEs 112 are depicted in FIG. 1, a base station 104 may be in communication with more or fewer UEs 112. A user equipment 112, in various embodiments, may be any device used by an end user, where the device communicates wirelessly with a base station 104. For example, a user equipment 112 may be a mobile phone, tablet, personal computer, autonomous vehicle, robot in a factory floor, wirelessly controlled surgical arm, or the like. In some embodiments of systems 100, different types of base stations 104 may correspond to and be used with different types of UE 112. For example, where a base station 104 is a cell site or cell tower, UEs 112 may be mobile phones, mobile hotspot devices, or other devices with mobile broadband adaptors. As another example, where a base station 104 is a Wi-Fi access point, UEs 112 may be computers or other devices in a wireless local area network. Various other or further types of UEs 112 may be used with various other or further types of base station 104.

Certain examples and illustrations are provided herein with reference to base stations 104 and UEs 112 for mobile telephony/data. For example, transmissions may be consistent or at least partially compatible with standards developed by the 3rd Generation Partnership Project (3GPP) for fourth generation (4G) or fifth generation (5G) wireless networks, such as, respectively, releases of the Long Term Evolution (LTE) or New Radio (NR) standards. However, these examples relating to mobile telephony/data are provided for illustrative and not limiting purposes. Similar techniques for scheduling requests and spectral resource allocation may be used in other types of wireless communication.

In the depicted embodiment, the UEs 112 include antennas 116 for communicating with the base station 104. UEs 112 in various embodiments may include other or further components not depicted in FIG. 1, such as processors, memory, transceivers, and the like. In the depicted embodiment, the UEs 112 include scheduling request send modules 114, which may be implemented by controllers or processors of the UEs 112, and which are used to send scheduling requests to the base station 104.

In various embodiments, a base station 104 may communicate with a plurality of UEs 112. The base station 104 may allocate spectral resources, such as blocks of subcarrier frequencies and/or time intervals for using the subcarrier frequencies, to the UEs 112 for communication. To avoid inefficient allocation or under-utilization of spectral resources, the base station 104 may allocate certain spectral resources to UEs 112 in response to scheduling requests from the UEs 112. The term "scheduling request" (SR) may be used herein to refer to any request from a UE 112 to the base station 104 for grant or allocation of spectral resources, and the UE 112 that sends the request may be referred to as the requesting UE. For example, FIG. 1 depicts UE 112a sending a scheduling request (indicated by the arrow labeled "SR") to the base station 104, so UE 112a is the requesting UE for that scheduling request.

In various embodiments, "grant-based" allocation of spectral resources in response to scheduling requests may use resources efficiently by allocating resources to UEs 112 that will use them. By comparison, "grant-free" or "configured grant" preallocation of spectral resources to UEs 112 without requests may result in inefficient allocation of time and frequency resources to a UE 112 that will not use those time and frequency resources. However, preallocation of spectral resources may make them immediately available to UEs 112, while grant-based allocation of spectral resources may add latency to transmissions due to the added time for requesting and granting resources.

Additionally, in current 4G and 5G standards, specific spectral resources are allocated to each UE 112 for transmitting scheduling requests. However, SRs may be infrequent, and the spectral resources allocated for sending SRs may themselves be left unused most of the time. Additionally, in current standards, different UEs 112 may be assigned different time intervals for sending SRs within a 1 millisecond (ms) or 10 ms SR resource period. Thus, a UE 112 that wants to request resources, but that has missed its assigned time interval within the current SR resource period, may have to wait an average of 0.5 to 5 ms to send an SR during its assigned time interval within the next resource period. The result is that preallocating time and frequency resources to UEs 112 for sending SRs results in inefficient underutilization of scarce spectral resources, and in added latency while UEs 112 wait to send the SRs.

By contrast, in the depicted embodiment, the base station 104 may be configured to communicate with UEs 112 without allocating spectral resources to the UEs 112 for communicating scheduling requests. The base station 104 may be configured to detect an SR from a requesting UE (e.g., UE 112a in FIG. 1), where the SR is a spread spectrum signal. A spread spectrum SR, in some embodiments, may indicate an identity for the requesting UE without conveying information other than the identity. For example, in FIG. 1, the SR sent by UE 112a may indicate only that UE 112a is requesting resources, without indicating specific time or frequency resources requested, an amount of data to be transmitted using the resources, or the like.

In various embodiments, the use of spread spectrum techniques may spread the power used to transmit an SR across a frequency spectrum or band that includes multiple subcarriers allocated to UEs 112, so that the SR does not significantly interfere with communication between the base station 104 and the UEs 112 over the subcarriers. Additionally, in some embodiments, two or more different requesting UEs 112 may send SRs simultaneously (e.g., in the same time interval or overlapping time intervals) using different spreading sequences, and the base station 104 may demultiplex the simultaneous SRs to identify and grant resources to the requesting UEs if the different spreading sequences are orthogonal (zero correlation) or otherwise low correlation sequences. Thus, in some embodiments, the use of spread spectrum techniques with orthogonal or low correlation spreading sequences may allow UEs 112 to send SRs, without the base station 104 allocating subcarrier frequencies or time intervals to the UEs 112 for sending the SRs. Thus, the inefficient underutilization of spectral resources allocated to send SRs may be avoided.

Additionally, using spread spectrum techniques to send simultaneous SRs from different UEs 112 may avoid the latency associated with assigning different periodically repeating time intervals to UEs 112 for sending SRs, and making a requesting UE 112 wait for its assigned time interval before sending an SR. The term "non-periodic scheduling request" or the abbreviation "NP-SR" may be used herein to refer to SRs that are transmitted non-periodically (e.g., infrequently, whenever a UE 112 needs spectral resources). In some embodiments, NP-SRs may be transmitted using spread spectrum techniques without preconfiguring a periodicity and/or offset for a UE 112 that would require the UE 112 to wait for its assigned time interval before sending an SR.

In some embodiments, UEs 112 and base stations 104 configured to send and detect NP-SRs may facilitate low latency, high reliability communication between the base stations 104 and UEs 112. Various types of user equipment 112, or types of applications that use wireless communication may be more sensitive or less sensitive to network latency and reliability. For example, latency of several milliseconds between a mobile phone and a base station 104 may be tolerable to users making voice calls or downloading web pages. Similarly, a person using a smartphone to watch streaming video over a wireless network may not notice high latency or dropped packets as long as the smartphone is able to download and buffer data faster than the video player consumes the data. However, some applications may require low latency and high reliability. For example, wireless communication for factory automation, autonomous vehicles, or remote surgery may require low latency and high reliability, as a dropped or delayed packet may result in property damage or human injury.

For 5G wireless networks, the 3GPP has provided standards for ultra-reliable low-latency communication (URLLC) applications. URLLC applications require high reliability and low latency, and may include applications such as remote surgery, autonomous vehicles, factory automation, and the like. Quality of service (QoS) standards for URLLC applications may include "air interface" latency of less than 1 ms with 99.999% system reliability. In some embodiments UEs 112 and base stations 104 using NP-SRs may meet latency QoS standards for URLLC applications while still providing efficient grant-based allocation of spectral resources (which would normally be associated with higher latency). Various ways of synthesizing, detecting, and/or compensating for interference in NP-SRs are described in further detail below.

In the depicted embodiment, a requesting UE (e.g., UE 112a) includes an SR send module 114. SR send modules 114 may be implemented by controllers or processors of the UEs 112, and may be configured to send scheduling requests (e.g., NP-SRs) to the base station 104. The SR send module 114 for the requesting UE 112 may send the SR to the base station 104 by transmitting the SR as a spread spectrum signal (e.g., via an antenna 116). The SR send module 114 for the requesting UE 112 may send the SR to the base station 104 without receiving a prior grant of spectral resources for sending the scheduling request.

The requesting UE 112 may transmit a signal (such as an NP-SR) to inform the base station 104 of its existence within a cell, or to request a service. The NP-SR carries or indicates the identity of the requesting UE 112, so that the base station 104 can allocate spectral resources to the requesting UE 112. Some types of scheduling requests or others signals from UEs 112 may also carry a small number of bits that determine the type of service that is requested. However, in some embodiments, an NP-SR may indicate the identity of the requesting UE 112 without carrying or indicating additional information. The UEs 112 do not transmit SRs when not requesting resources. Thus, SRs will be on when a UE 112 is sending a request, and will be off, when there is no request. Hence, the signaling for SRs may be called on/off signaling or keying. Although on/off signaling methods are disclosed herein for NP-SRs, they may similarly be used for other control signals from UEs 112 to base stations 104 (or in other communication networks) where the control signals are infrequent or carry small quantities of information.

Because SRs (or other on/off signals) come infrequently, when resources are requested and carry a small number of bits (e.g., information to identify the requesting UE), they may be sent using a direct sequence spread spectrum (DSSS) technique. Moreover, to allow integration of NP-SRs within the common wireless networks of 5G or beyond, and to allow for simple detection of NP-SRs, possibly without determining or estimating how a communication channel affects the NP-SR signal, a cyclic prefix (CP) may be added to DSSS signal packets. Accordingly, the name CP-DSSS is used in this document when reference is made to the proposed on/off signaling method.

In general, DSSS techniques involve sending sequence of information bits, modulated by a spreading sequence, where the bit rate for the spreading sequence is much faster than the bit rate for the information bits. The receiver may know the spreading sequence (or a related sequence) and use it to demodulate the modulated information to recover the information bits. The effect is that a bandwidth for the information bits is shifted to a much wider bandwidth, thus preventing or mitigating interference with or from narrowband signals. For on/off keying (e.g., when sending NP-SRs), the information to be sent may be a single "on" or "off" bit, and the spreading sequence itself may indicate which UE 112 is sending the on/off signal. For example, a requesting UE 112 may send its spreading sequence when the information bit is "on" (to send an NP-SR) and may send nothing when the information bit is "off" (when not requesting spectral resources). The base station 104 may identify which UE 112 sent the NP-SR and may grant resources to the requesting UE 112 by comparing the DSSS signal it received to the different spreading sequences for different SRs.

In various embodiments, multiple UEs 112 may use DSSS techniques with multiple different spreading sequences to send information simultaneously. The use of different spreading sequences by different transmitters using the same communication channel is the basis for code-division multiple access (CDMA). In some embodiments, it may be desirable for different spreading sequences to have low or zero cross-correlation (allowing the signals to be demultiplexed at the receiver), and to have low or zero autocorrelation to mitigate multipath interference. Various suitable orthogonal (zero correlation) or low correlation spreading sequences may include Zadoff-Chu sequences, columns or rows of Walsh Matrices, pseudorandom spreading sequences, and the like. Other or further zero correlation or low correlation spreading sequences will be recognized by one of skill in DSSS or CDMA fields.

In addition, adding a cyclic prefix (CP) may be added to a DSSS transmission or signal packet may involve prefixing the DSSS packet with modulated bits from the end of the packet. The addition of a cyclic prefix may prevent intersymbol interference from previous packets, and may facilitate compatibility with orthogonal frequency-division multiplexing (OFDM) symbols in 4G and 5G applications, where cyclic prefixes may make time-limited signals more like infinite, periodic signals to facilitate simple processing of the signals in the frequency domain (e.g., using fast Fourier transform (FFT) and inverse fast Fourier transform (IFFT) techniques).

The CP-DSSS method disclosed herein for sending NP-SRs can be used without prior allocation of spectral resources to UEs 112, either for grant-free transmission (e.g., preallocating resources so as to not use SRs) or even for sending the SRs themselves. In some embodiments, NP-SRs are transmitted over the same spectral resources as other communications between the UEs 112 and the base station 104 (e.g., across subcarrier frequencies that may be or have been allocated to UEs 112), but may be transmitted at a level that introduces a minimal interference. The added interference may increase the current background noise plus interference by only a small fraction of one decibel. In other words, the CP-DSSS signals are transmitted at a sufficiently low level to co-exist with other communications within the system 100.

The SR send module 114 for a requesting UE 112 may construct an NP-SR signal based on a spreading sequence that identifies the UE 112. In one embodiment, the spreading sequence may be (or include, after addition of a cyclic prefix) a Zadoff-Chu sequence with a cyclic offset that identifies the requesting UE. In another embodiment, the spreading sequence may be (or include, after addition of a cyclic prefix) a sum of two or more Zadoff-Chu sequences, with cyclic offsets that collectively identify the requesting UE 112. Although Zadoff-Chu sequences are disclosed herein as a basis for NP-SRs or other on/off control signals, other orthogonal or low-correlation sequences may be used in other embodiments of on/off signaling.

As background for the discussion herein of on/off keying and NP-SRs using Zadoff-Chu (ZC) sequences, we first refer to some properties of ZC sequences. In general, during a time interval such as an OFDM symbol interval, a signal may be sampled at N different time indices, and may be processed in the time domain, or in the frequency domain (e.g., using FFT and IFFT algorithms to transform information between time and frequency domains). A sampling sequence may similarly include N elements to be transmitted and sampled.

Let a root ZC sequence $z_0$ be defined as follows:

$$z_0 = \begin{bmatrix} z_0 \\ z_1 \\ z_2 \\ \vdots \\ z_{N-1} \end{bmatrix} \qquad (1)$$

The circularly shifted versions of $z_0$ may be defined as $z_1, z_2, \ldots, z_{N-1}$:

$$z_1 = \begin{bmatrix} z_{N-1} \\ z_0 \\ z_1 \\ \vdots \\ z_{N-2} \end{bmatrix}, z_2 = \begin{bmatrix} z_{N-2} \\ z_{N-1} \\ z_0 \\ \vdots \\ z_{N-3} \end{bmatrix}, \ldots, z_{N-1} = \begin{bmatrix} z_1 \\ z_2 \\ z_3 \\ \vdots \\ z_0 \end{bmatrix} \qquad (2)$$

ZC sequences have the property that the set of vectors $z_0, z_1, z_2, \ldots, z_{N-1}$ are orthogonal to each other. That is, for all values of i and j in the range of 0 to N-1:

$$z_i^H z_j = 0, \text{ for any } i \neq j, \qquad (3)$$

where the superscript H denotes Hermitian (i.e., conjugate transpose). Additionally, the root sequence $z_0$ may be normalized to the length of unity. With this additional property, the orthogonality property of ZC sequences that was just mentioned may be summarized as $$z_i^H z_j = \begin{cases} 1, & i = j \\ 0, & i \neq j \end{cases} \qquad (4)$$

Figure 3:
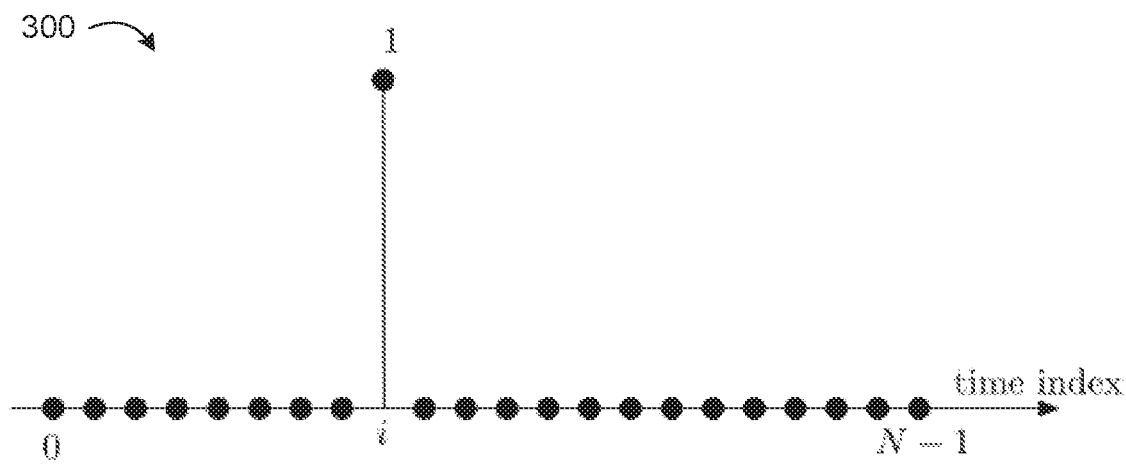
FIG. 3 depicts a graph of an ideal despread spread-spectrum signal, omitting the effects of a channel.

Another property of ZC sequences that can be derived from the above property, specifically, from equation (4), is the following. The circular correlation of $z_i$ and the $z_0$ is a vector of zeroes with a "1" located at the ith time index. Referring to FIG. 3, a graph 300 depicts the circular correlation of $z_i$ with $z_0$. The result is zero at all time indices except time index i, where the result is 1.

Thus, in some embodiments, an SR send module 114 may send an NP-SR (or another on/off control signal using CP-DSSS techniques) by using a single ZC sequence as a spreading sequence. Different ZC sequences $z_i$ with different cyclic offsets i may be assigned to different UEs 112 as spreading sequences to send NP-SRs as spread spectrum signals. In a theoretically ideal transmission with no interference, noise, or other channel effects, the base station 104 would receive a spread spectrum signal, which would be zero (or noise) if no UEs 112 have sent NP-SRs, or which would be a ZC sequence or sum of ZC sequences if one or more UEs 112 have sent NP-SRs. The base station 104 could then despread the spread spectrum signal by circularly correlating the received signal with the root ZC sequence $z_0$, with the result being similar to the graph 300 of FIG. 3, with one or more ones at time indices that are the cyclic offsets assigned to the requesting UEs 112 and zeroes at other time indices. Accordingly, the use of ZC sequences in some embodiments may allow a base station 104 to despread a spread spectrum signal and identify the requesting UE 112, by using a single despreading sequence (the root ZC sequence $z_0$) that correlates in different ways with different spreading sequences for different UEs 112. Other orthogonal or low correlation sequences may be used for spreading and despreading, but may require the base station 104 to try different despreading sequences, thus increasing either the latency for trying different despreading sequences in order, or the processing power for trying different despreading sequences in parallel.

Alternatively, in another embodiment, an SR send module 114 may send an NP-SR (or another on/off control signal using CP-DSSS techniques) by using a sum or difference of two or more ZC sequences as a spreading sequence, where the cyclic offsets for the ZC sequences collectively identify the requesting UE 112. The base station 104 could then despread the spread spectrum signal by circularly correlating the received signal with the root ZC sequence $z_0$, with the result being similar to the graph 300 of FIG. 3, with one or more ones at time indices that identify the requesting UE(s) 112. However, reuse of different cyclic offsets in different pairs of cyclic offsets for ZC sequence may result in false detection of a UE 112 that has not sent an NP-SR as a requesting UE.

Additionally, when dealing with practical signals rather than with a theoretical transmission, despreading a received spread spectrum signal by circularly correlating the received signal with the root ZC sequence $z_0$ may not produce a result similar to the graph 300 of FIG. 3. After adding a cyclic prefix to the spreading sequence, transmitting the resulting signal over a channel subject to channel effects such as attenuation, delay, interference, and noise, receiving the signal, removing the cyclic prefix, and despreading the signal by circularly correlating it with the root ZC sequence $z_0$, the result may not be a 1 at a single time index and zeros elsewhere, but may be a more complicated complex-valued pulse across a wider range of time indices. This result, and ways to handle it, are described in further detail below in the context of the base station 104 receiving the signal, with reference to FIGS. 2-6.

Figure 2:
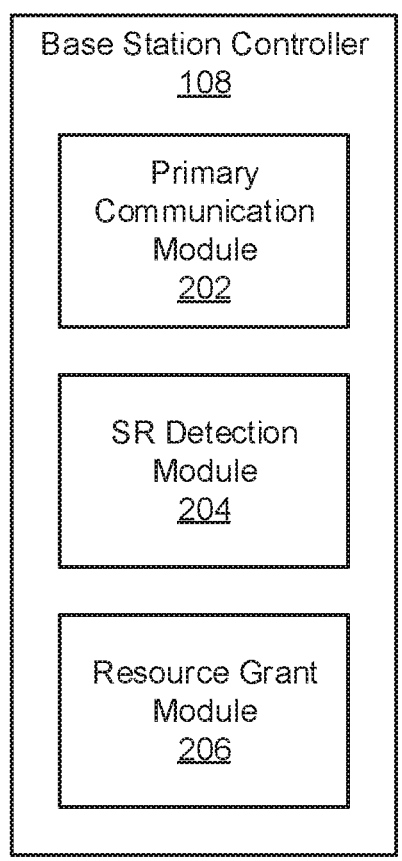
FIG. 2 is a block diagram illustrating one embodiment of a base station controller.

FIG. 2 depicts one embodiment of a base station controller 108. The base station controller 108, in the depicted embodiment, may be a component of a base station 104, and may be substantially as described above with reference to FIG. 1. In the depicted embodiment, the base station controller includes a primary communication module 202, an SR detection module 204 and a resource grant module 206, which are described below.

In the depicted embodiment, the primary communication module 202 is configured to communicate with a plurality of UEs 112. The primary communication module 202 may use, include, or communicate with other components of a base station 104 such as transceivers 106 and antennas 110 to communicate with UEs 112 by sending and receiving signals. In further embodiments the primary communication module 202 may be configured to communicate with UEs 112 without allocating spectral resources to the UEs 112 for communicating scheduling requests.

The term "spectral resources" as used herein may refer to any time and/or frequency resources within a communication spectrum or, a portion of a spectrum, that are controlled, granted, or allocated by a base station 104. For example, time resources may include one or more frames, subframes, slots, symbol intervals, or the like, for sending data. Similarly, frequency resources may include one or more subcarrier frequencies, blocks of subcarrier frequencies, or the like, for sending data.

For digital communication, data bits may be mapped to symbols according to a digital modulation scheme such as such as quadrature amplitude modulation (QAM), phase shift keying (PSK) or the like. Symbols may be complex numbers with a real part and an imaginary part (or, equivalently, an amplitude and phase) that may represented on the complex plane as points in a constellation diagram (e.g., for a QAM or PSK constellation). In a finite set of complex-valued symbols, each symbol may represent one or more data bits. For example, in a constellation of eight symbols, each symbol may encode or represent a different three-bit value. Similarly, in a constellation of 256 symbols, each symbol may encode or represent a different eight-bit value. During a symbol interval, a symbol may be transmitted by using the amplitude and phase of a symbol to modulate an electromagnetic carrier wave (or, equivalently, using the real and imaginary parts of the symbol to modulate in-phase and quadrature carrier waves at the same frequency). In a frequency-division multiplexing scheme such as orthogonal frequency-division multiplexing (OFDM), multiple symbols may be transmitted simultaneously by modulating carrier waves of different frequencies, in which case the individual waves or frequencies are referred to herein as subcarrier waves, signals, or frequencies. Symbols may be received and decoded back to data bits by determining the amplitude and phase (or the real and imaginary parts) of each subcarrier. Fast Fourier transform (FFT) and inverse fast Fourier transform (IFFT) techniques may be used to convert between signals that are transmitted and received in the time domain (e.g., a receiver may sample subcarrier waves at N different time indices across a symbol interval) and the information content of the signals in the frequency domain (e.g., the amplitude and phase, or real and imaginary parts of the symbols used to modulate the subcarrier waves).

Thus, when the base station 104 allocates spectral resources, the smallest allocatable resource element is one subcarrier frequency, over a time interval for sending one symbol (a "symbol interval"). However, in some embodiments, a base station 104 may allocate spectral resources in larger increments. For example, the base station 104 may allocate frequency resources to UEs 112 in resource blocks of twelve consecutive subcarriers. In some embodiments, a base station 104 may similarly allocate time resources to UEs 112 in 10 ms frames, 1 ms subframes, 0.5 ms slots or the like, where a slot includes multiple symbol intervals. Other frequency or time block sizes (e.g., with more or fewer than 12 subcarrier frequencies, or with more or fewer symbol intervals than the number of symbol intervals in a 0.5 ms slot) may similarly be allocated by a base station 104.

The primary communication module 202, in various embodiments, may communicate with UEs 112 by controlling, sending, or receiving primary or "normal" communications with the UEs 112 using spectral resources allocated to the UEs 112, including frequency resources such as allocated subcarrier frequencies or frequency blocks, and time resources such as symbol intervals, slots, subframes, or frames. However, the base station 104 may, in some embodiments, not allocate spectral resources to the UEs 112 for sending schedule requests. Instead, UEs 112 may send NP-SRs as spread spectrum signals at any time (e.g., in any OFDM symbol interval), without a prior allocation of frequency or time resources for sending the NP-SRs.

The SR detection module 204, in the depicted embodiment, is configured to detect a scheduling request from a requesting UE 112 of the plurality of UEs 112 that the primary communication module 202 communicates with. For example, in FIG. 1, UE 112a is the requesting UE that sends the SR, and the other UEs 112b-n are non-requesting UEs which may be in communication with the primary communication module 202. The SR detection module 204 may use, include, or communicate with other components of a base station 104 such as transceivers 106 and antennas 110 to detect an SR.

As described above with reference to FIG. 1, a scheduling request may be a spread spectrum signal based on a spreading sequence. In various embodiments, for on/off keying, an SR "based on" a spreading sequence may be the spreading sequence itself when the SR is "on" or may be a modification of the spreading sequence such as by adding a cyclic prefix to the spreading sequence. The transmitted spread spectrum signal may be off or zero when no SR is sent, in which case the received spread spectrum signal may consist of noise, but no spreading sequence. Additionally, a received spread spectrum signal "based" on a spreading sequence may include effects of a channel on the transmitted signal. For example, a transmitted signal may be a modification of the spreading sequence, and the received signal may be further modified by attenuation, delay, interference, and noise, but may still be referred to as being based on the spreading sequence.

In various embodiments, a scheduling request from a requesting UE may indicate identity of the requesting UE without indicating other information than the identity. In various embodiments, information "indicated" by a spread spectrum signal may refer to useful information conveyed by the signal after it is despread. Thus, in some embodiments, the information indicated by the spread spectrum signal may be fewer bits of information than the literal bits of the spreading sequence. For example, for on/off keying, the information indicated by a spread spectrum signal with N elements may amount to considerably fewer than $2^N$ bits of information. Instead, the presence or absence of the spreading sequence in the received signal may indicate one bit of information (whether an SR has been sent or not), and the spreading sequence itself may be one of a comparatively small number (e.g., less than $2^N$) of spreading sequences that carry different meanings. In some embodiments, spreading sequences may be assigned to UEs 112 with one spreading sequence per UE 112, so that detecting one of the spreading sequences in the received signal indicates only the identity of the UE 112 that sent an SR, without indicating other information such as specific time or frequency resources requested, an amount of data to be transmitted using the resources, or the like. Various ways for an SR detection module 204 to detect an SR are described in further detail below with reference to FIGS. 3-15.

The resource grant module 206, in the depicted embodiment, is configured to grant spectral resources to a requesting UE 112 in response to the SR detection module 204 detecting a scheduling request from the requesting UE 112. The resource grant module 206 may use, include, or communicate with other components of a base station 104 such as transceivers 106 and antennas 110 to grant spectral resources to a requesting UE 112. In some embodiments, the resource grant module 206 may grant spectral resources by transmitting a grant signal allocating the resources to the requesting UE 112. The requesting UE 112 may then use the allocated resources for data communication. In some embodiments, where the scheduling request does not indicate information other than the identity of the requesting UE 112, the resource grant module 206 may grant a standard-size block of frequency and/or time resources to the requesting UE 112. If additional resources are needed, the requesting UE 112 may send one or more additional SRs.

In some embodiments, the resource grant module 206 is configured to grant spectral resources to the requesting UE within a predefined time interval after the base station 104 receives the spread spectrum signal for an NP-SR. In further embodiments, the predefined time interval may be based on a QoS standard or guarantee for the requesting UE 112 or for an application provided by the requesting UE 112. For example, a URLLC UE 112 may be associated with a QoS latency standard requiring "air interface" latency of less than 1 ms, and the resource grant module 206 may grant spectral resources to a requesting UE 112 within 1 ms after the base station 104 receives an NP-SR. In another embodiment, "air interface" latency may include the entire time between a UE 112 having uplink data ready to transmit to a base station 104 and the base station 104 receiving the uplink data, and thus may include time to generate and send the SR, receive and detect the SR, generate and send a resource grant, receive the grant transmission and start using the granted resources and so on, and the resource grant module 206 may grant spectral resources to a requesting UE 112 within substantially less time than an air interface latency standard provides in order for the data transmission process as a whole to meet a QoS standard for latency. For example, the resource grant module 206 may grant spectral resources to a requesting UE 112 as soon as it is able to, which may be within a few milliseconds, one millisecond, or even a fraction of millisecond.

In some embodiments, the base station 104 may use the SR detection module 204 to detect multiple simultaneous SRs from multiple requesting UEs 112, using multiple spreading sequences. The base station 104 may then use the grant module 206 to grant spectral resources to the requesting UEs 112. Orthogonality of ZC sequences (or low correlation between other spreading sequences) allows SRs to be transmitted by multiple UEs 112, and demultiplexed by the SR detection module 204 in the detection process in a manner similar to demultiplexing CDMA signals from different transmitters.

In some embodiments, the base station 104 (e.g., using the resource grant module 206) may be configured to grant spectral resources that include subcarrier frequencies to the plurality of UEs 112. Subcarrier frequencies may be OFDM subcarriers, or the like, and may in some embodiments be allocated in blocks of consecutive frequencies. The base station 104 may use the primary communication module 202 to communicate with UEs 112 using the granted subcarrier frequencies, while the base station 104 receives the spread spectrum signal. The spread spectrum signal from a requesting UE 112 may coexist with normal or primary communication with other UEs 112 via allocated subcarriers, and may still be detected by the SR detection module 204 as described below. In some embodiments, a power level for communicating using the granted subcarrier frequencies may be above or even significantly above (e.g., multiple decibels (dB) above) a power level for the spread spectrum signal that communicates NP-SRs. For example, the power level for communicating using the granted subcarrier frequencies may be at least 2 dB, 3 dB, 6 dB, 10 dB, 15 dB, 20 dB or more above the power level of the spread spectrum signal. In fact, the power level for the spread spectrum signal may be below a noise power level for the spectrum used by the spread spectrum signal, and the SR detection module 204 may still be able to detect an NP-SR as described below.

As background for the discussion herein of detecting NP-SRs that were transmitted using Zadoff-Chu (ZC) sequences, FIGS. 3-6 depict graphs of some properties of ZC sequences and of channels.

FIG. 3 depicts a graph 300 of an ideal despread spread-spectrum signal, omitting the effects of a channel. As described above, a UE 112 may send an NP-SR using a spreading sequence that is (or includes) a single ZC sequence with a cyclic offset that identifies the requesting UE 112, or that is (or includes) the sum of two or more ZC sequences with cyclic offsets that collectively identify the requesting UE. For example, a spreading sequence may be the sum of a pair of ZC sequences with a respective pair of cyclic offsets that identifies the requesting UE 112. As further described above, the base station 104 (e.g., using the SR detection module 204) may despread a spread spectrum signal generated using one or more cyclically shifted ZC sequences $z_i$, by circularly correlating the received signal with the root ZC sequence $z_0$.

The graph 300 of FIG. 3 depicts an ideal result of despreading, where the received signal is exactly equal to the transmitted signal $z_i$, with no channel effects such as attenuation, delay, interference, or noise. The result is zero at all time indices except time index i, where the result is 1. In other words, the result is an impulse at time index i. Similarly if a spread spectrum signal is transmitted as the sum of two ZC sequences $z_{\Delta_1} + z_{\Delta_2}$, the received signal, after despreading (circularly correlating with the root-ZC sequence $z_0$), will be a pair of impulses (possibly with amplitude of 1 or a different amplitude, depending on normalization) at time indices $\Delta_1$ and $\Delta_2$, similar to the single impulse at time index i in the graph 300.

Figure 4:
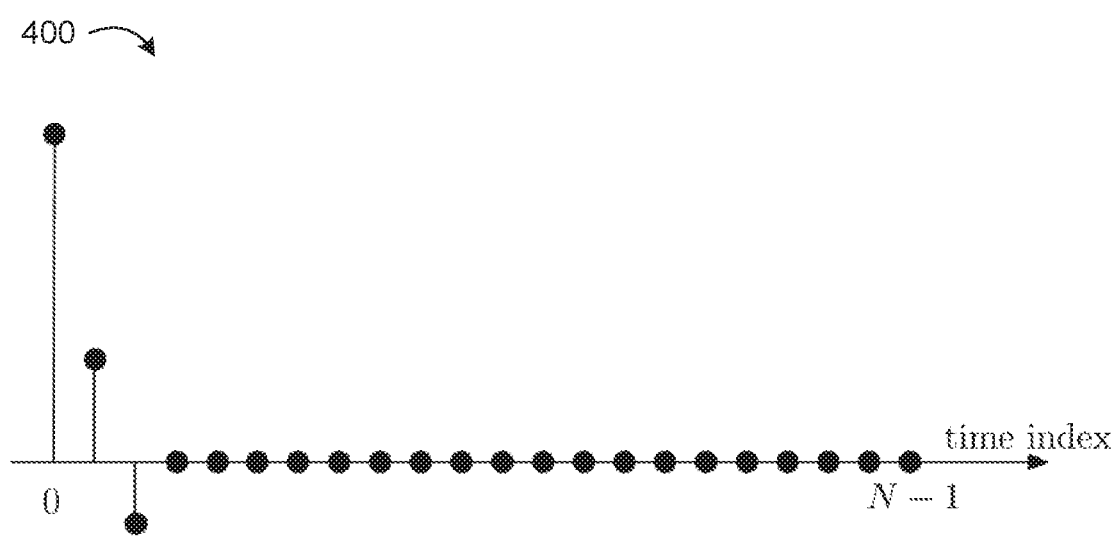
FIG. 4 depicts a graph of a channel impulse response.

FIG. 4 depicts a graph 400 of a channel impulse response. In FIGS. 4-6 and 13, graphs 400, 500, 600, 1300 relating to channel impulse responses depict examples of real values although a channel impulse response may be complex-valued. The exemplary real values may be real parts of the channel impulse responses, amplitudes of the channel impulse responses, or the like. In various embodiments, a channel impulse response $h_i$ for user equipment i may be a sequence or vector of complex values received or sampled from a received signal at N different time indices (e.g., across an OFDM symbol interval for received signals), where the transmitted signal is an impulse at time index 0. Thus, the channel impulse response depicted in the graph 400 represents or models effects of a channel (such as attenuation, delay, interference, and noise) on a transmitted impulse signal.

With an impulse at time index zero, the channel impulse response has significant amplitude at early time indices, and falls to zero or to lower, noise-level amplitudes at later time indices. Thus, the term "channel impulse response" and the symbol $h_i$ representing the channel impulse response for user equipment i may be used herein to refer to a sequence or vector of less than N different values, where the zero or near-zero values for later time indices are omitted. For example, where samples from a received signal are processed using an FFT algorithm in blocks of 2048 time indices, a root ZC sequence $z_0$ may have a corresponding length N=2048, but a channel impulse response $h_i$ may have a shorter length of 64 time indices (or another length less than 2048).

Figure 5:
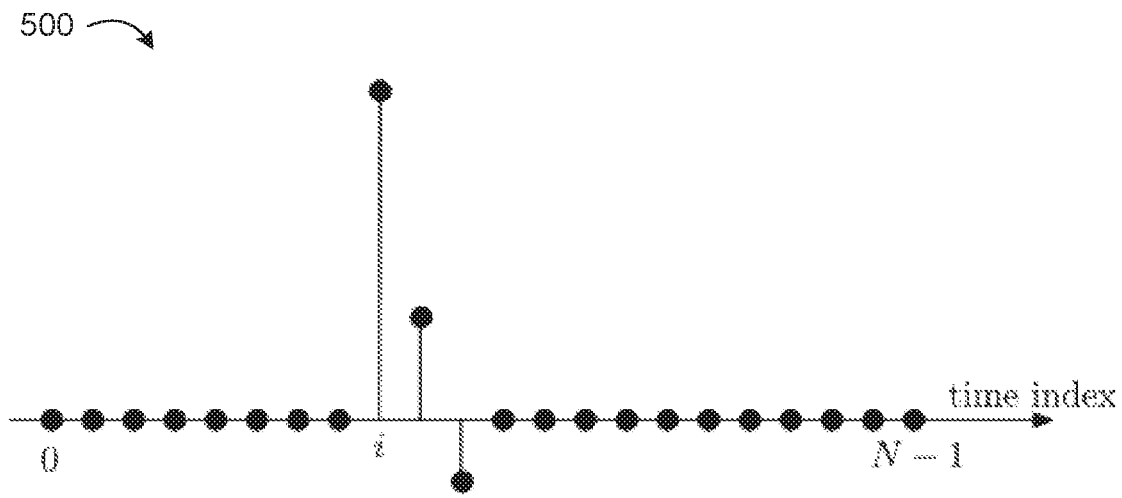
FIG. 5 depicts a graph of a despread spread spectrum signal, in one embodiment, including the effects of a channel.

FIG. 5 depicts a graph 500 of a despread spread spectrum signal, in one embodiment, including the effects of a channel. The graph 500 shows the result of transmitting a cyclically shifted ZC sequence $z_i$, receiving it subject to channel effects such as attenuation, delay, interference and noise, and despreading the received signal by circularly correlating the received signal with the root ZC sequence $z_0$. Instead of the result being an idealized impulse at time index i, as in FIG. 3, the result shown by the graph 500 is a channel impulse response (as in FIG. 4), shifted to time index i.

Additionally, the shifted impulse response resulting from despreading a cyclically shifted ZC sequence $z_i$ may, in some embodiments, represent transformations in addition to channel effects. For example, the impulse response in FIGS. 4 and 5 may be the result of adding a cyclic prefix to a ZC sequence before transmission, passing the cyclic prefixed ZC sequence a channel, removing the cyclic prefix from the received signal, and despreading the result using the root ZC sequence $z_0$. The channel impulse response thus is affected by the channel itself and by other transformations such as adding and removing a cyclic prefix as if the other transformations were channel effects.

Figure 6:
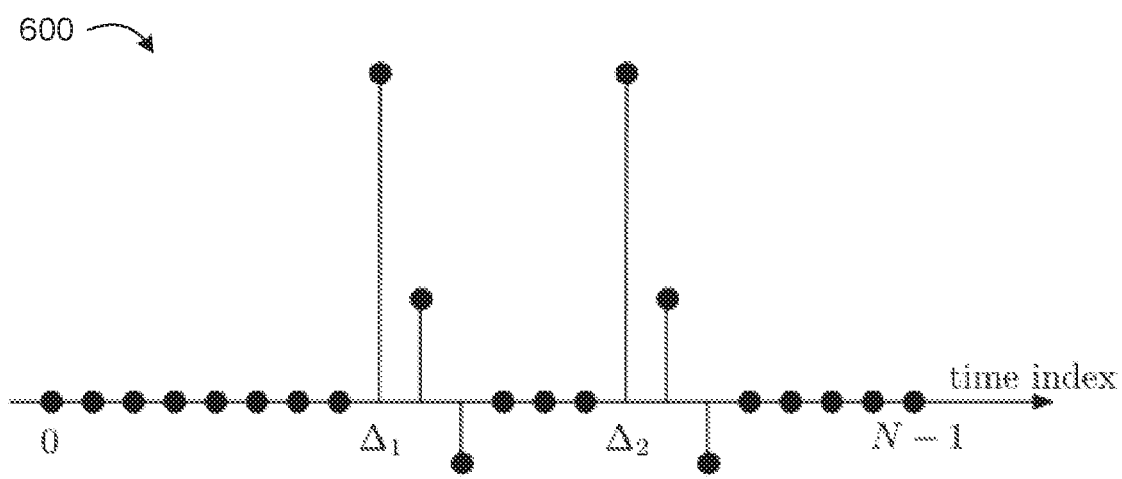
FIG. 6 depicts a graph of a despread spread spectrum signal, in another embodiment.

FIG. 6 depicts a graph 600 of a despread spread spectrum signal, in another embodiment. In the depicted embodiment, spreading sequences are of the form $z_{\Delta_1} + z_{\Delta_2}$, where the pair of cyclic offsets $\Delta_1$ and $\Delta_2$ is unique for each UE 112 in communication with the base station 104. After adding a cyclic prefix (CP) to the spreading sequence, passing the cyclic prefixed version of the spreading sequence through a channel, removing the cyclic prefix, and despreading (by circular correlation with the root ZC sequence $z_0$), the result depicted in the graph 600 is two channel impulse responses (as in FIG. 4), shifted to time indices $\Delta_1$ and $\Delta_2$. Further variations including sums of more than two ZC sequences, combinations of ZC sequences with different normalization coefficients or weights (e.g., differences of ZC sequences) may similarly be used as spreading sequences for NP-SRs, with results after despreading similarly comprising shifted, scaled, and/or inverted channel impulse responses at time indices corresponding to the ZC sequences used to construct the spreading sequence.

The use of a single ZC sequence to construct a spreading sequence (with results as depicted in FIG. 5) leads to a transmit signal with a very low peak-to-average power ratio (PAPR), but will limit the number of UEs 112 that can be served. This is because different choices of cyclic offset values should be sufficiently separated from each other to avoid interference of despread pulses from different UEs 112. Thus, the number of cyclic offset values (and corresponding ZC sequences) that can cover one OFDM symbol interval will be limited.

On the other hand, the use of two ZC sequences to construct a spreading sequence (with results depicted in FIG. 6) may serve more UEs 112 by allowing more unique variations of the pair of parameters $\Delta_1$ and $\Delta_2$, but PAPR increases and the detection of a pair of despread pulses becomes a more complex task for the base station 104 (as compared to detection of a single pulse).

Thus, in various embodiments, the general process used by the SR detection module 204 to detect an NP-SR from a requesting UE 112 may include despreading the received spread spectrum signal (e.g., circularly correlating the received signal with the root-ZC sequence $z_0$), and determining whether a pulse such as a channel impulse response occurs at a time index, a pair of time indices, or a set of time indices assigned to the requesting UE 112. In further embodiments, the SR detection module 204 may check for channel impulse responses at different time indices (or sets of time indices) corresponding to different UEs 112 in parallel to rapidly identify which UE 112 sent an NP-SR.

The position of these pulses in the despread signal informs the base station 104 which UE 112 has made the scheduling request. In other words, the base station 104 may assign a single index Δ or a pair of indices $\Delta_1$ and $\Delta_2$ to each UE 112 as part of the network set up and subsequently by examining the presence and position of the respective pulses, may detect the presence of a scheduling request that may have been sent from any of the UEs 112. Note that detection of whether a pulse (i.e., the respective impulse response) occurs at a time index may be performed without regard to the shape of the pulse is irrelevant to the detection and, thus, NP-SR detections may be performed without knowing of the shape of the channel impulse response; and therefore without channel estimation.

As described above, ZC sequences have useful autocorrelation and cross-correlation properties for use as spreading sequences. However, other sets of orthogonal or low-correlation sequences may be used as spreading sequences. Additionally, for any choice of length N, there may be many possibilities to choose from to define the root ZC sequence $z_0$. The ZC sequences have the general form of $$z_i = e^{\frac{j u \pi i^2}{N}}, \text{ for } i = 0, 1, \ldots, N-1$$

where u is any integer prime to N. The parameter u is often referred to as the root of the ZC sequence. ZC sequences with different roots are not orthogonal to one another, but correlation between them can be kept low by proper choice of the respective roots. The article 'J. W. Kang, Y. Whang, B. H. Ko and K. S. Kim, "Generalized Cross-Correlation Properties of Chu Sequences," in IEEE Trans. Info. Theory, vol. 58, no. 1, pp. 438-444, January 2012', provides further details. In a large network, with a large number of URLLC UEs 112, one may choose to use ZC sequences with multiple root parameters u. This allows one to increase the number of UEs 112 that can be simultaneously served to a very large number.

FIG. 7 depicts one embodiment of a table 700 of pairs of cyclic offsets that identify UEs 112. The table 700 is used to allocate delay parameters or cyclic offsets $\Delta_1$ and $\Delta_2$ to different UEs 112 in a wireless communication system 100, to construct NP-SRs as spread spectrum signals with spreading sequences of the form $z_{\Delta_1}+z_{\Delta_2}$. The depicted delay parameters are disclosed for exemplary and non-limiting purposes. A skilled person in possession of this disclosure will be able to identify other or further delay parameters for constructing NP-SRs from ZC sequences.

In some embodiments, the length of the (nonzero portion of the) channel impulse response h is about 5% of the FFT length for OFDM symbols, or smaller. In further embodiments, cyclic prefix length may be equal to 7% of the FFT length. Hence, the total number of delay parameters that lead to a set of non-overlapping impulse responses is about 20 (=1/0.05). Moreover, with a pair of delay parameters $\Delta_1$ and $\Delta_2$ allocated to each UE 112 (as discussed above), a cell can serve a maximum of 10 URLLC UEs 112 (i.e., UEs 112 that may transmit NP-SRs), if the desire is to have no overlapping pairs of delay parameters, to avoid interference or misdetection impulse responses from different UEs 112. This may be overly limiting as a cell may have more than 10 URLLC UEs 112.

This limitation may be resolved by choosing the delay parameters $\Delta_1$ and $\Delta_2$, for different UEs 112 such that one of the delay parameters may be common between a pair of UEs 112, but not both. The table 700 depicted in FIG. 7 is an example table of choices of $\Delta_1$ and $\Delta_2$ for a case where the length of FFT (root ZC sequence) is 2048 and the (nonzero) length of h, for various channels is assumed to be a maximum of 100 samples. Detection of NP-SRs using the depicted delay parameters (or similar pairs of partially overlapping delay parameters) problems associated with detection of NP-SRs, and solutions to those problems are described below with reference to subsequent Figures.

Figure 8:
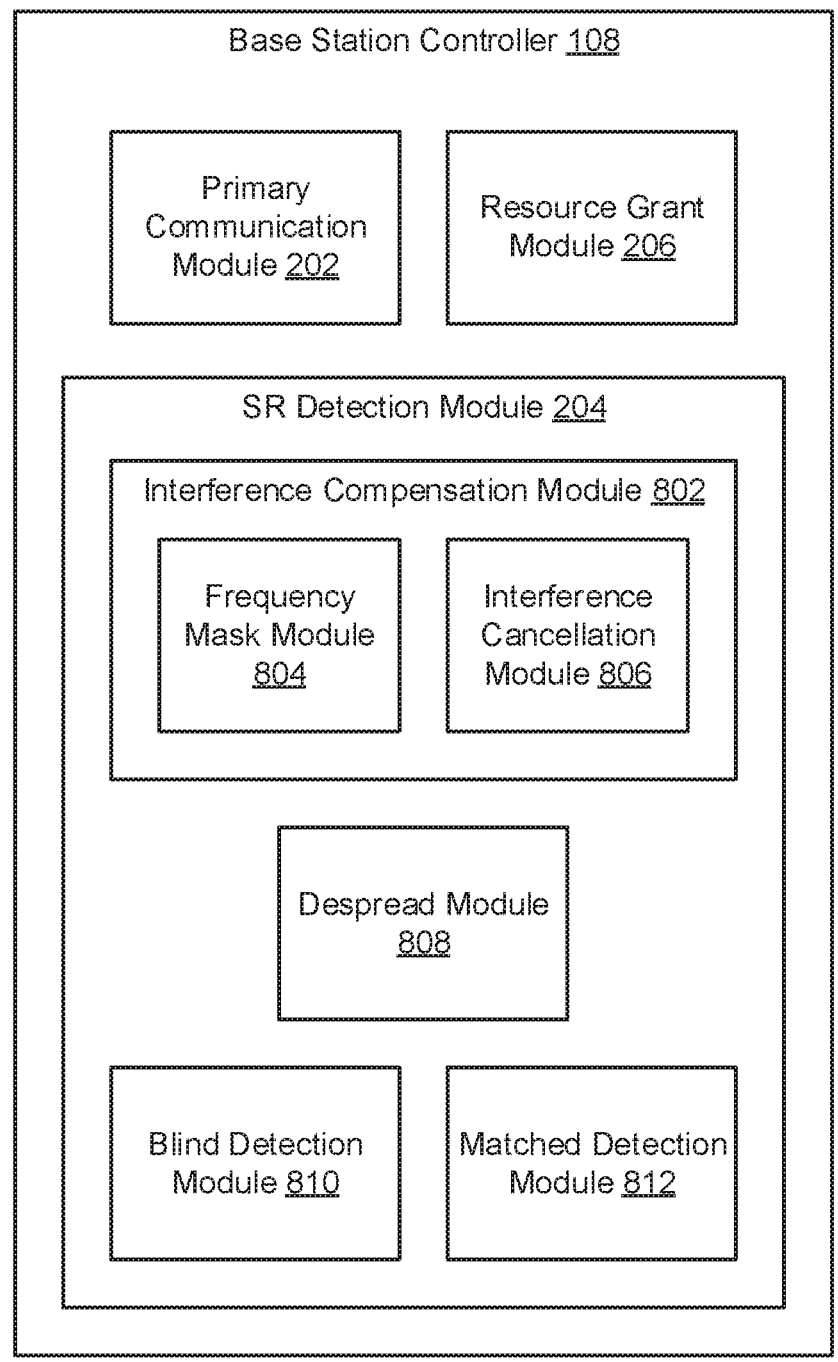
FIG. 8 is a block diagram illustrating another embodiment of a base station controller.

FIG. 8 depicts another embodiment of a base station controller 108. In the depicted embodiment, the base station controller 108 may be substantially as described above with reference to FIGS. 1 and 2, including a primary communication module 202, and SR detection module 204, and a resource grant module 206 which may be substantially as described above. Additionally, in the depicted embodiment, the SR detection module 204 includes an interference compensation module 802, a despread module 808, a blind detection module 810, and a matched detection module 812, which are described below. The interference compensation module 802 in the depicted embodiment includes a frequency mask module 804 and an interference cancellation module 806, which are described below. In further embodiments, an SR detection module 204 may include or omit certain modules that are described here. For example, the matched detection module 812 may be omitted in some embodiments.

As described above, the general process used by the SR detection module 204 to detect an NP-SR from a requesting UE 112 may include despreading the received spread spectrum signal (e.g., circularly correlating the received signal with the root-ZC sequence $z_0$), and determining whether a pulse such as a channel impulse response occurs at a time index, a pair of time indices, or a set of time indices assigned to the requesting UE 112. In further embodiments, the SR detection module 204 may check for channel impulse responses at different time indices (or sets of time indices) corresponding to different UEs 112 in parallel to rapidly identify which UE 112 sent an NP-SR. In various embodiments, the SR detection module 204 may use the despread module 808 to despread the received spread spectrum signal, and may use the blind detection module 810 or the matched detection module 812 to detect pulses at time indices corresponding to UEs 112.

However, in some embodiments, portions of the transmission band for the spread spectrum signals are cluttered by various high-power signals, such as primary communications with UEs 112 over subcarrier frequencies in the same transmission band. Interference with primary communication may cause detection of NP-SRs or other CP-DSSS signals to become unreliable. Thus, in various embodiments, an SR detection module 204 detecting or attempting to detect an NP-SR may use an interference compensation module 202 to compensate the spread spectrum signal for interference from communications with the plurality of UEs 112. Compensating the spread-spectrum signal may involve modifying the spread spectrum signal in one or more ways to mitigate the effects of interference. In some embodiments, despreading the spread spectrum signal may involve converting the signal from the time domain to the frequency domain (e.g., using an FFT), performing operations in the frequency domain, and converting the result back to the time domain (e.g., using an IFFT). In further embodiments, the interference compensation module 202 may compensate the spread spectrum signal for interference by modifying the signal in the time domain or the frequency domain.

To more clearly describe interference compensation, we first describe despreading in further detail. The SR detection module 204 may use the despread module 808 to despread a spread spectrum signal, to produce a despread signal. The despread module 808 may despread the spread spectrum signal by circularly correlating the received signal with the root-ZC sequence $z_0$ (or with another despreading sequence corresponding to one or more spreading sequences if spreading sequences are not based on ZC sequences). The despread module 808 may use or include hardware for performing the circular correlation such as a digital signal processor, memory for storing signals or intermediate results, hardware or software modules configured to perform FFT and IFFT algorithms, or the like.

In the following discussion of despreading by circularly correlating $z_0$ with the CP-striped received signal, the received signal is referred to as vector y. The despread module 808 may despread the received signal y in the frequency domain by performing the following operations:

$$\text{despread signal} = \text{IFFT}(\text{conj}(\text{FFT}(z_0)) \odot \text{FFT}(y)). \quad (5)$$

Here, FFT and IFFT indicate "fast Fourier transform" and "inverse fast Fourier transform" operations, respectively, conj(·) means taking conjugates of elements, and ⊙ denotes element-by-element multiplication of two vectors.

In some embodiments, primary communications signals at allocated subcarrier frequencies may interfere with detection of CP-DSSS signals such as NP-SRs. In further embodiment, the interference compensation module 802 may compensate for interference by using the frequency mask module 804 to mask a set of frequencies out of the spread spectrum signal. Because the base station 104 allocates the subcarrier frequencies to the UEs 112, it also knows which subcarrier frequencies are allocated, and can mask out those frequencies.

In the depicted embodiment, the frequency mask module 804 may mask a set of frequencies out of the spread spectrum signal by a simple element-by-element operation in the frequency domain. When portions of the received signal are cluttered by normal communication signals, the frequency mask module 804 may mask such signals out in conjunction with the despread module 808 by modifying equation (5) as $$\text{despread signal} = \text{IFFT}(\text{conj}(\text{FFT}(z_0)) \odot \text{FFT}(y) \odot m) \quad (6)$$

where m is a masking vector. The masking vector m may have elements that are either 0 or 1. Zeroes force frequencies in y (e.g., elements of FFT(y)) that are cluttered by some normal communication signals to zero, and ones keep the rest of the frequencies in y unmasked. The choice of the masking vector m is known to the receiver, i.e., the base station 104, since it is the base station 104 that provides grants to all UEs 112 for sending their respective signals. In some embodiments, the 0 and 1 elements in m may be in clusters of 12 bits, corresponding to resource blocks of 12 consecutive subcarriers.

The addition of the masking vector m to equation (6) is a linear filtering. In the time domain, the time domain response of this filtering operation circularly convolves with the channel impulse response and thus extends the duration of the pulses that are seen after despreading. This does not change the property of NP-SR signals where impulse response pulses appear at prespecified time indices in the despread signal. Thus, detection methods disclosed herein remain applicable, and only the shape of the impulse response pulses is changed.

Figure 9:
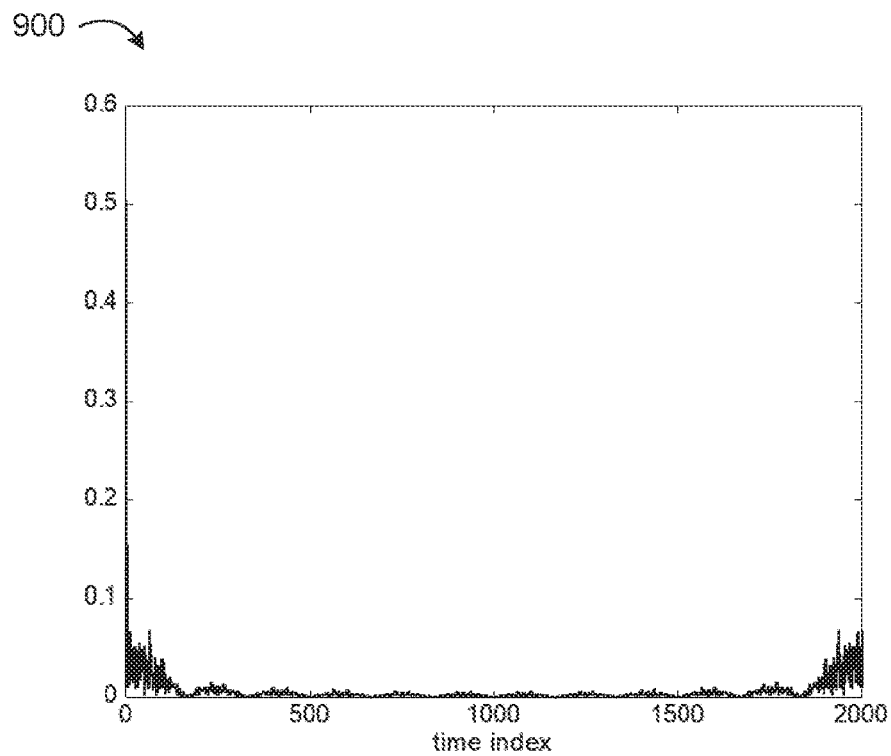
FIG. 9 depicts a graph of the inverse fast Fourier transform (IFFT) of a masking vector, in one embodiment.
Figure 10:
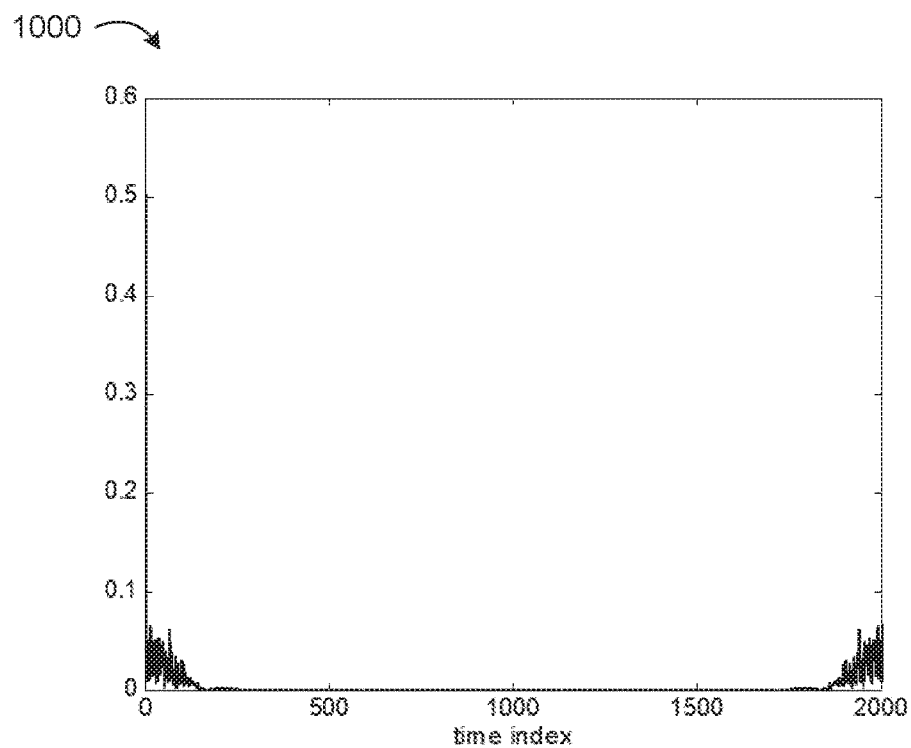
FIG. 10 depicts a graph of the (IFFT) of a masking vector, in another embodiment, with partial masking of boundary frequencies.

To gain some insight to the form of impulse responses that correspond to the masking vector m, FIGS. 9 and 10 depict graphs 900, 1000 showing examples of the magnitude of the IFFT of m. In graph 900, depicted in FIG. 9, half of the elements of m are 1 and the rest are zero. This translates to amplitude of around 0.5 at time-index 0. The non-zero time-domain samples at the time indices that are different from zero originate from the transitions of the elements of m from 1 to 0 and from 0 to 1. These non-zero samples that are spread across time over the full period may be limited to samples that are near the beginning or wrapped around near the end of the period, by introducing roll-offs to the transitions of the elements of m from 1 to 0 and from 0 to 1. Graph 1000, depicted in FIG. 10, presents a sample example of magnitude of the IFFT of m when raised-cosine roll-offs have been introduced to the transitions of the elements of m from 0 to 1 and from 1 to 0.

More generally, referring back to FIG. 8, the frequency mask module 804 may be configured to mask frequencies out of the spread spectrum signal, where masking the frequencies includes partial masking of frequencies at boundaries between fully masked and fully unmasked frequencies. Elements of m may be zero for fully masked frequencies and 1 for fully unmasked frequencies, and may be between zero and one for partially masked frequencies. Thus, partial masking of frequencies by the frequency mask module 804 at boundaries between fully masked and fully unmasked frequencies may include using a masking vector m with roll-off elements between zero and one at boundaries between blocks of zeros and blocks of ones. A roll-off between one and zero elements may be a raised-cosine roll-off as described above, or may be based on another roll-off function.

The effect of using the frequency mask module 804 to mask out subcarrier frequencies for primary communications prior to despreading the spread spectrum signal is that the respective subcarriers are suppressed, and detection is based on the remaining (unmasked) portion of the received signal. Although masking out allocated subcarrier frequencies may be effective in many situations, it may be less effective if too many of the available subcarrier frequencies are allocated and masked out. For example, if close to 100% of the subcarriers are allocated to primary communication, and masked out of the received spread spectrum signal by the frequency mask module 804, there may be little information left in the interference-compensated signal for despreading.

Thus, in some embodiments, the interference compensation module 802 may compensate for interference in another way. In further embodiments, the interference compensation module 802 may use the interference cancellation module 806 to compensate the spread spectrum signal for interference by cancelling one or more signal estimates for communications with the plurality of UEs 112 out of the spread spectrum signal.

As opposed to interference suppression performed by the frequency mask module 804, interference cancellation performed by the interference cancellation module 806 may involve removing the normal or primary communication signals (or estimates thereof) from the spread spectrum signal, prior to attempting to detect one or more NP-SR requests. This may often be possible given that the mainstream task of the base station 104 and the primary communication module 202 involves receiving and detecting the normal communication signals (i.e., the main traffic). The procedure of detecting or estimating any specific normal communication signal depends on its construction. For instance, when the information content of the signals is coded and the respective codeword spans over multiple OFDM symbol frames, to avoid any delay in detection NP-SR(s), soft detection and cancellation may be adopted for the present OFDM frame. In such cases, the cancellation will be only partial. On the other hand, when the information content of a normal communication signal is limited to a single OFDM symbol frame, detection and cancellation of the normal signals may be more accurate.

In either case, the term "signal estimate" is used to refer to what the interference cancellation module 806 cancels out of or subtracts from the spread spectrum signal. Where a normal communication signal is correctly detected, the "estimate" may be an exact value. However, a signal estimate may be a rougher estimate or a less exact value when the interference cancellation module 806 uses soft detection and cancellation. Various methods of interference cancellation, known or yet to be discovered, may be used by an interference cancellation module 806 to compensate a spread spectrum signal for an NP-SR for interference from primary communications.

In certain embodiments, the interference compensation module 802 may determine whether to compensate for interference by using frequency masking or interference cancellation by comparing the number or percentage of allocated subcarriers to a threshold. If the subcarriers are heavily allocated (with the number or percentage above a threshold), the interference compensation module 802 may use the interference cancellation module 806 to compensate for interference. Otherwise, the interference compensation module 802 may use the frequency mask module 804 to compensate for interference. Various other or further methods may be used to determine whether to use frequency masking or interference cancellation.

Once the received spread spectrum has been despread by the despread module 808 (and, optionally, interference-compensated by the interference compensation module 802), the SR detection module 204 may use the blind detection module 810 for blind detection of NP-SR signals, or may use the matched detection module 812 for matched detection of NP-SR signals. In general, blind detection does not use prior knowledge or estimates of channel impulse responses. By contrast, matched detection may obtain and use regular estimates of the channel impulse response for the active URLLC UEs 112 in order to detect of NP-SR pulses.

In either case, the location and the span of pulses in the despread signal that correspond to different UEs 112 are known, and the SR detection module 204 may separate portions of the despread signal for different UEs 112 for further processing. For example, where an NP-SR signal has been constructed using a single ZC sequence $z_A$, with a different $\Delta$ for each UE 112, the portion of the despread signal in the interval between time indices $\Delta$ and $\Delta+L_{ch}$ may be separated and separately examined (e.g., processed in parallel) for each UE 112, where $L_{ch}$ denotes the duration of the channel impulse response (or the significantly non-zero portion of the channel impulse response).

Similarly, where an NP-SR signal has been constructed by adding a pair of ZC sequences as $z_{A_1}+z_{A_2}$, vectors $a_i$ and $b_i$ may be portions of the despread signal separated out for the ith UE 112 at time index intervals corresponding to the cyclic offsets $\Delta_1$ and $\Delta_2$ assigned to the ith UE 112, with lengths of $L_{ch}$. The vectors $a_i$ and $b_i$ may then be separately examined (e.g., processed in parallel) for each UE 112.

The blind detection module 810, in various embodiments, is configured to detect NP-SRs based on pulses in one or more portions of the despread signal, without using estimates of the channel impulse responses for different UEs 112. In one embodiment, where an NP-SR signal has been constructed using a single ZC sequence $z_A$, the blind detection module 810 may detect the corresponding pulse in the interval $\Delta$ and $\Delta+L_{ch}$, by checking if the amplitude of any samples of the despread signal in that interval exceed a pre-specified threshold, $\gamma_1$. Assuming that the background signal/noise is a white Gaussian process, this threshold determines the probability of false detection (i.e., detection of presence of a pulse when there is no pulse). Hence, a fixed threshold leads to a constant false detection rate. False detections may lead to waste of scarce spectral resources allocated to UEs 112 that have not requested any resources, and are desirable to minimize. Thus, the detection threshold may be chosen large enough that the probability of false detection remains small.

In another embodiment, where an NP-SR signal has been constructed by adding a pair of ZC sequences as $z_{A_1}+z_{A_2}$, a blind detection module 810 may use a similar process to what was mentioned above for the detection of a single pulse may be used to detect the presence of a pair of pulses that correspond to each UE 112. However, the use of a common parameter $\Delta_1$ or $\Delta_2$ between different UEs 112 (e.g., to serve a large number of UEs 112), may cause certain problems. For example, consider the case where an OFDM symbol interval has been divided in to eight intervals to accommodate eight distinct pulses. Here, these eight intervals are divided to two groups of four intervals named $\{\alpha_1, \alpha_2, \alpha_3, \alpha_4\}$ and $\{\beta_1, \beta_2, \beta_3, \beta_4\}$, and 16 pairs of intervals $\{\alpha_i, \beta_j\}$ for i and j in the range 1 to 4 are used to hold pairs of pulses that represent 16 UEs 112. Now consider the case where two UEs 112 send NP-SRs using the pairs of intervals $\{\alpha_1, \beta_3\}$ and $\{\alpha_2, \beta_4\}$. The simple peak detector that was introduced in the previous paragraph may identify pulses in intervals $\alpha_1, \alpha_2, \beta_3$, and $\beta_4$, and may thus correctly identify UEs 112 represented by pairs $\{\alpha_1, \beta_3\}$ and $\{\alpha_2, \beta_4\}$, as possible senders of NP-SRs, but may also identify UEs 112 represented by pairs $\{\alpha_2, \beta_3\}$ and $\{\alpha_1, \beta_4\}$ as possible senders of NP-SRs. To resolve this ambiguity, the blind detection module 810 may perform additional detection tests or steps described below For the ith UE 112, we denote the portions of the despread signal that may contain the corresponding pulses (i.e., the pair of channel impulse responses) by the vectors $$a_i=\eta_i h_i+n_{i,1} \quad (5)$$

and $$b_i=\eta_i h_i+n_{i,2} \quad (6)$$

where $h_i$ is the channel impulse response between the ith UE 112 and the base station 104, $n_{i,1}$ and $n_{i,2}$ are two independent noise vectors (independent of one another and independent of $h_i$), and $\eta_i=1$ when an NP-SR has been transmitted and $\eta_i=0$ when no NP-SR has been transmitted. In other words, if the ith UE 112 sends an NP-SR, the single-bit parameter $\eta_i$ is turned "on" and the channel impulse response pulse $h_i$ appears in both the $a_i$ and $b_i$ portions of the despread signal. Otherwise, the parameter $\eta_i$ is turned "off" and the $a_i$ and $b_i$ portions of the despread signal may be noise vectors (unless a pulse $h_j$ from the jth UE 112 sending an NP-SR appears in either the $a_i$ or $b_i$ portion of the despread signal).

One method of detecting the presence of an NP-SR (e.g., whether the channel impulse response pulse $h_i$ appears in both the $a_i$ and $b_i$ vectors) is to find the inner product of the vectors $a_i$ and $b_i$. That is, $$a_i^H b_i = \eta_i^2 h_i^H h_i + n_{i,1}^H n_{i,2} + \eta_i(h_i^H n_{i,2} + n_{i,1}^H h_i). \qquad (7)$$

This inner product reduces to the zero-mean random variable $n_{i,1}^H n_{i,2}$ when $\eta_i=0$ (i.e., no NP-SR has been transmitted). On the other hand, it will have a real and positive mean equal to $h_i^H h_i$ when $\eta_i=1$ (i.e., an NP-SR has been transmitted). Moreover, the zero-mean noise portion of the inner product increases from $n_{i,1}^H n_{i,2}$ to $n_{i,1}^H n_{i,2} + h_i^H n_{i,2} + n_{i,1}^H h_i$. Thus, a way of identifying the presence of an NP-SR is to examine the real part of $a_i^H b_i$, and compare it against a threshold, $\gamma_2$. If it is greater than the threshold, we assume that $\eta_i=1$, i.e., an NP-SR has been transmitted. Otherwise, we assume that $\eta_i=0$, i.e., no NP-SR has been transmitted.

However, the NP-SR detection method which was mentioned in the previous paragraph may pick up an excessive amount of noise under many channel conditions. While most of the channel impulse response energy is localized over a relatively small length of the vector h, the noise/interference energy is almost equally distributed across all the elements of the vectors $n_1$ and $n_2$. Taking note of this point, we now refer to FIG. 12, which is a flowchart diagram illustrating one embodiment of a method 1200 for detecting a scheduling request. The method 1200 may be used by a blind detection module 810 to detect an NP-SR. The method 1200 is provided as an example, and other methods (known or yet to be discovered) of detecting channel impulse pulses in noisy spectrums may be used by a blind detection module 810. The description of the method 1200 may refer to vectors a, b, and h, which may be the vectors $a_i$, $b_i$, and $h_i$ for the ith UE 112. The method 1200 may be carried out iteratively or in parallel with respective vectors a, b, and h, for each of the UEs 112, to detect which if any of the UEs 112 sent an NP-SR.

The method 1200 begins by calculating 1202 the mean of every M adjacent elements of the vector $c = \Re\{a^* \odot b\}$, where $\odot$, as defined before, denotes element-by-element multiplication of two vectors, the superscript * means conjugation, and $\Re\{\cdot\}$ means taking the real part of. The length of M may be predetermined based on the expected lengths of the impulse response pulses h. For example, M may be greater than or equal to the length of a cluster of the significant samples of h. With this arrangement, we are effectively forming similar inner products to those in equation (7), but concentrate on different portions of h, instead of the whole vector of h. The sum of the entire element-by element product of a* and b would be the inner product of equation (7), but would include significant contributions from noise. Summing or averaging using a sliding window of M adjacent elements of the product results in a maximum output where significant amplitudes for h contribute to the sum or average, and in lower outputs at time indices where significant amplitudes for h are not found. Thus, the maximum of the sliding-window sum or average may be more useful for detecting NP-SRs than the inner product of equation (7).

Accordingly, the method 1200 continues by determining 1204 whether the maximum of the means calculated in step 1202 satisfies a threshold. Detecting an NP-SR by comparing the maximum to a threshold effectively concentrates on a portion of h that covers most of its energy, and leads to improved performance when compared to detecting an NP-SR by comparing the full inner product $a^H b$ to a threshold.

A similar method may be adopted for information recovery when multiple bits have been transmitted through a CP-DSSS signal.

If the maximum of the means is not above the threshold the method 1200 includes determining 1210 that no SR was received (at least not from the UE 112 under consideration). In some embodiments, if the maximum of the means is above the threshold, then the method 1200 includes determining 1208 that an SR was received (from the UE 112 under consideration) However, in the depicted embodiment, the method 1200 includes further processing of the a and b vectors.

Referring back to FIG. 7, with delay parameters $\Delta_1$ and $\Delta_2$ assigned as in FIG. 7 (or similarly to FIG. 7), the NP-SR detection algorithm may encounter any of the following problems. Without any loss of generality and for the ease of explanation we assume UE #1 has transmitted an NP-SR. In that case, either of the following two events can happen:

First, when the NP-SR detector is examining the presence of an NP-SR from UE #11 and this UE has not transmitted an NP-SR, the despread vectors a and b will appear as $a=n_1$ and $b=h+n_2$. Similarly, when UE #19 is examined and this UE also has not transmitted an NP-SR, one finds that $a=h+n_1$ and $b=n_2$. The presence of h as part of the despread vectors a or b increase the probability of false detection, i.e., an NP-SR is detected when no NP-SR has been transmitted.

Figure 11:
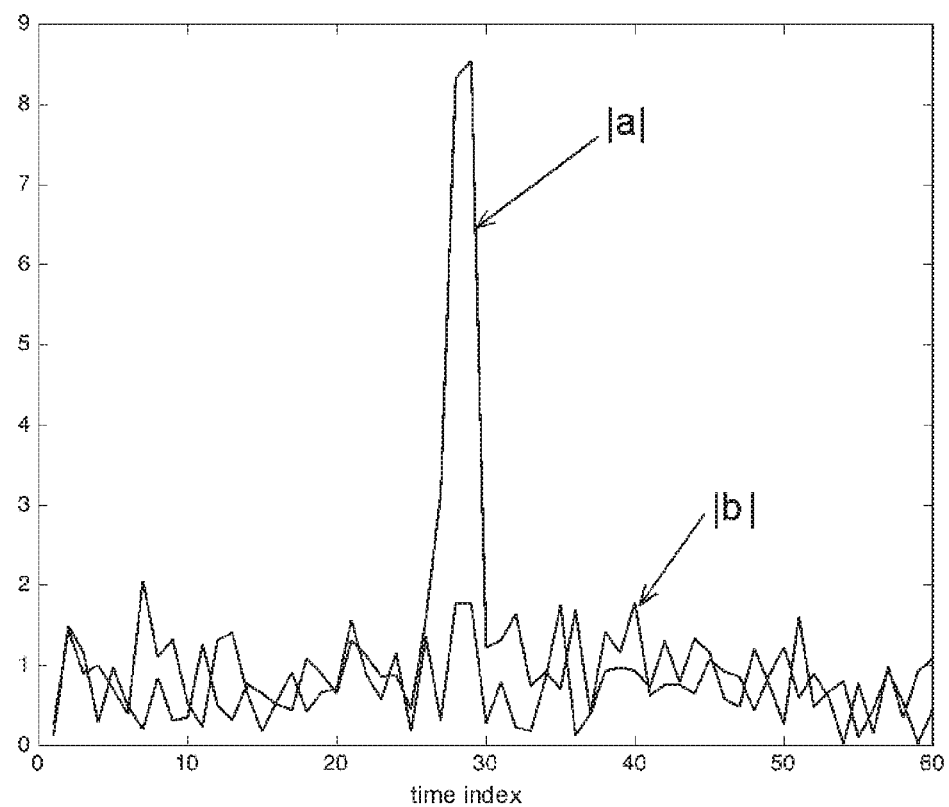
FIG. 11 depicts a graph of two portions of a despread spread spectrum signal, in one embodiment.
Figure 12:
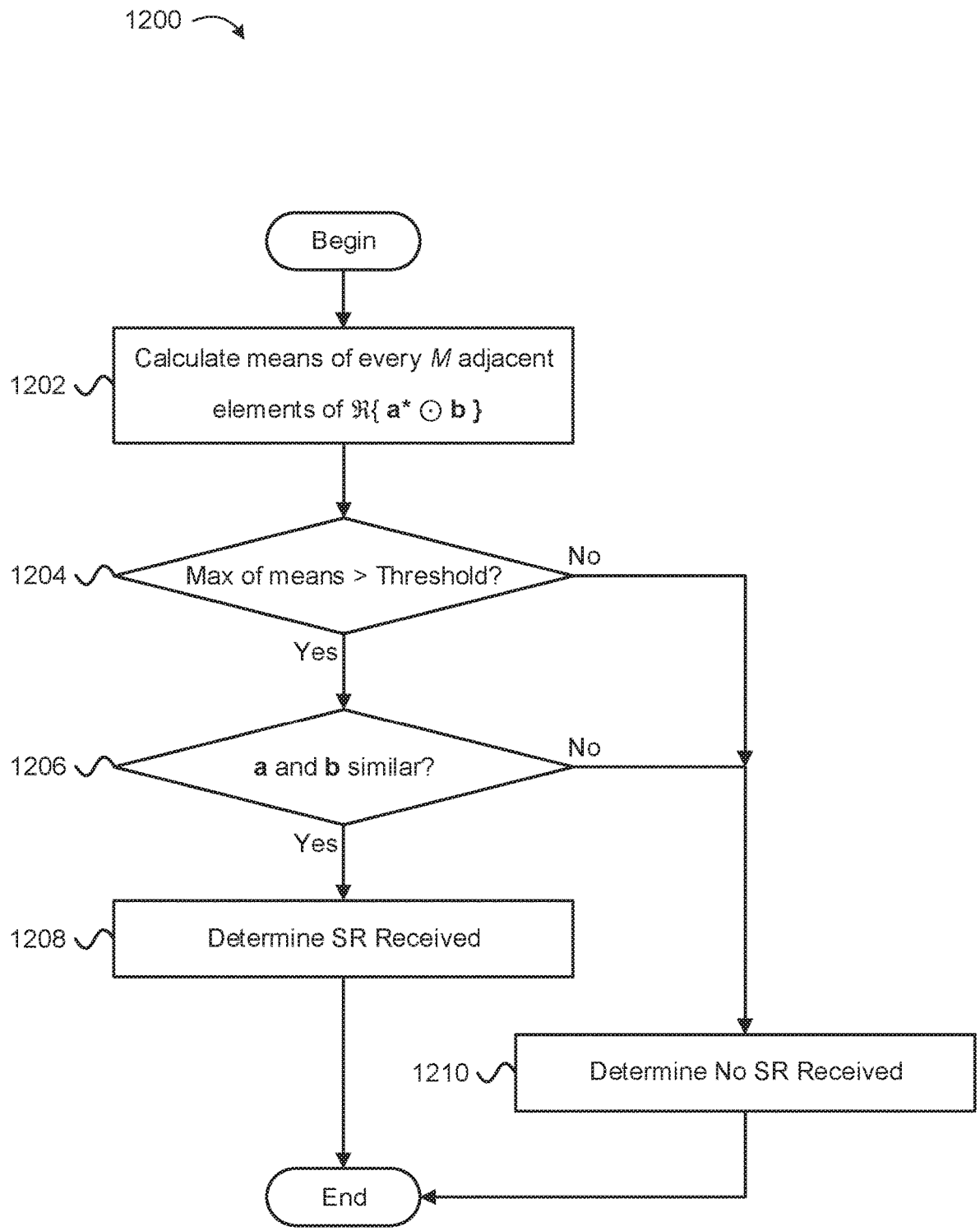
FIG. 12 is a flowchart diagram illustrating one embodiment of a method for detecting a scheduling request.

Second, when the NP-SR detector is examining the presence of an NP-SR from UE #11 and this UE also has transmitted an NP-SR, the despread vectors a and b will appear as $a=h'+n_1$ and $b=h+h'+n_2$, where h' is the channel impulse response of UE #11. Similarly, when UE #19 is examined and this UE also has transmitted an NP-SR, one finds that $a=h+h''+n_1$ and $b=h''+n_2$, where, here, h'' is the channel impulse response of UE #19. Here, the presence of h as part of the despread vectors a or b affects the detection of NP-SR and there is some chance that the probability of detecting an NP-SR decreases There are more cases that can happen in practice to obscure the NP-SR detection process. As a result, the probability of false detection may increase, and the probability of correctly detecting NP-SRs that have been transmitted may decrease. However, many of these cases happen infrequently, with a negligible impact on the overall performance may remain negligible. The most frequent case is the first of the two possible events mentioned above. Fortunately, there are a number of ways that one may choose to alleviate the false detections that occur in such scenario. To explain such a scenario and describe solutions to it, FIG. 11 depicts a graph 1100 of two portions a and b of a despread spread spectrum signal, in one embodiment. The graph depicts the magnitudes of sample vectors of $a=h+n_1$ and $b=n_2$. As seen, the presence of h in a makes the two vectors very distinct from one another. Therefore, a variety of signal processing techniques may be adopted to highlight this distinction.

When an NP-SR has been detected, there are two mostly likely cases (i) $a=h+n_1$ and $b=h+n_2$, or (ii) $a=h+n_1$ and $b=n_2$ or $a=n_1$ and $b=h+n_2$. In case (i), the NP-SR detection is a legitimate one (i.e., an NP-SR indeed has been transmitted). In this case, the vectors a and b are highly similar. In case (ii), since the vectors a and b are dissimilar, an NP-SR was not sent by the UE 112 under consideration. A blind detection module 810 may use a variety of different tests to determine whether vectors a and b are similar or dissimilar. For example, the blind detection module 810 may determine the partial correlation (PARCOR) of a and b, defined as $$PARCOR = \frac{a^H b}{\sqrt{(a^H a)(b^H b)}}.$$

If the magnitude of PARCOR is below a certain value, blind detection module 810 may determine that a and b are dissimilar. Otherwise, the blind detection module 810 may determine that a and b are similar. Many other or further tests may similarly be used by a blind detection module 810 to determine similarity or dissimilarity of a and b.

Accordingly, referring again to FIG. 12, a method 1200 of NP-SR detection may include determining 1206 whether portions a and b of a despread spread spectrum signal are similar. If a and b are not similar, as depicted in FIG. 11, then the method 1200 may include determining 1210 that no SR was received (at least not from the UE 112 under consideration). However, if a and b are similar, the method 1200 may include determining 1208 that an SR was received for the UE 112 under consideration, and the detection method 1200 may end. (The resource grant module 206 may then grant spectral resources to the requesting UE 112).

Referring back to FIG. 8, in some embodiments, the SR detection module 204 may use a matched detection module 812 to detect NP-SRs or other CP-DSSS pulses based on prior estimates of channel impulse responses. Matched filtering, as performed by the matched detection module 812, may require channel impulse responses for all active URLLC UEs 112 to be available at the base station 104. As wireless channels are time varying, estimates of the required channels may be made on a regular basis. In LTE and 5G NR, sounding reference signals (SRS) are allocated specific resources that may be used to send periodic pilot signals to estimate the channel impulse responses, in general. Here, we propose a method for an efficient use of SRS to estimate the channel impulse response of a number of URLLC UEs 112 simultaneously, by sending the respective SRS pilots over a single OFDM symbol frame. This joint SRS signaling is performed as discussed in the following paragraph.

Figure 13:
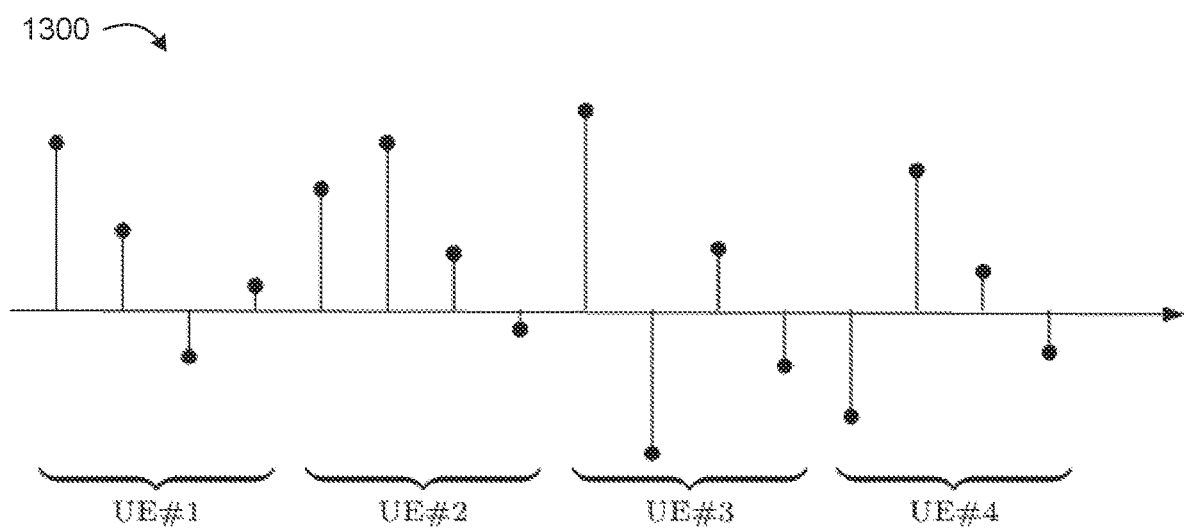
FIG. 13 depicts a graph of a despread spread spectrum signal, in one embodiment, including channel impulse responses for multiple UEs.

As discussed above, typically, an OFDM symbol frame may accommodate up to 20 users' channel impulse responses. Taking note of this point, 20 URLLC UEs 112 may transmit their respective pilots over the same OFDM symbol frame. To allow straightforward separation of the UE impulse responses, the following approach may be adopted. UE #1 transmits the root ZC sequence $z_0$, UE #2 transmits $z_L$, UE #3 transmits $z_{2L}$, . . . , UE #19 transmits $z_{19L}$, where $$L = \left\lfloor \frac{N}{20} \right\rfloor$$

and $\lfloor x \rfloor$ denotes the integer part of x. Considering the properties of the ZC sequences that were discussed earlier in this document, the received signal at the base station 104, after removing CP and despreading delivers a sequence of channel impulse responses of UE #1, UE #2, . . . , in this order, over the consecutive intervals of L samples. FIG. 13 depicts a graph 1300 of a despread spread spectrum signal, in one embodiment, including channel impulse responses for multiple UEs 112. The graph 1300 shows channel impulse response estimates for the simplified case where L=4 and there are 4 UE impulse responses.

The matched detection module 812 may use estimated channel impulse responses to detect NP-SRs. We present the detection process using the estimated channel for a particular user, say, UE #i. Here, we discuss the case where a single pulse is transmitted to indicate an NP-SR. Extension to the case when more than one pulse is transmitted should be clear in view of the rest of this document.

For the ith UE 112, the estimated channel is $\hat{h}_i$ and the recovered NP-SP signal, after despreading is $$a_i = \eta_i h_i + n_{i,1}$$

Here, $\eta_i = 1$, if an NP-SR has been transmitted, and $\eta_i = 0$, otherwise. Assuming the estimate of the channel is accurate, $\hat{h}_i \approx h_i$. The presence of an NP-SR is thus evaluated by comparing the scalar quantity $$\gamma_i \Re [\hat{h}_i^H a_i]$$

to some threshold $\gamma$. If $\gamma_i > \gamma$, it is determined that an NP-SR has been transmitted, otherwise, it is determined that no NP-SR has been transmitted.

In certain embodiments, the matched filtering approach used by the matched detection module 812 may be superior to the blind approach discussed with reference to the blind detection module 810. This is because the matched filtering approach, in the detection process, gives a higher weight to those samples of $a_i$ that match with the stronger/larger samples of $h_i$. However, the price paid for this superior performance is the use of additional resources used to estimate the channel impulse responses.

Figure 14:
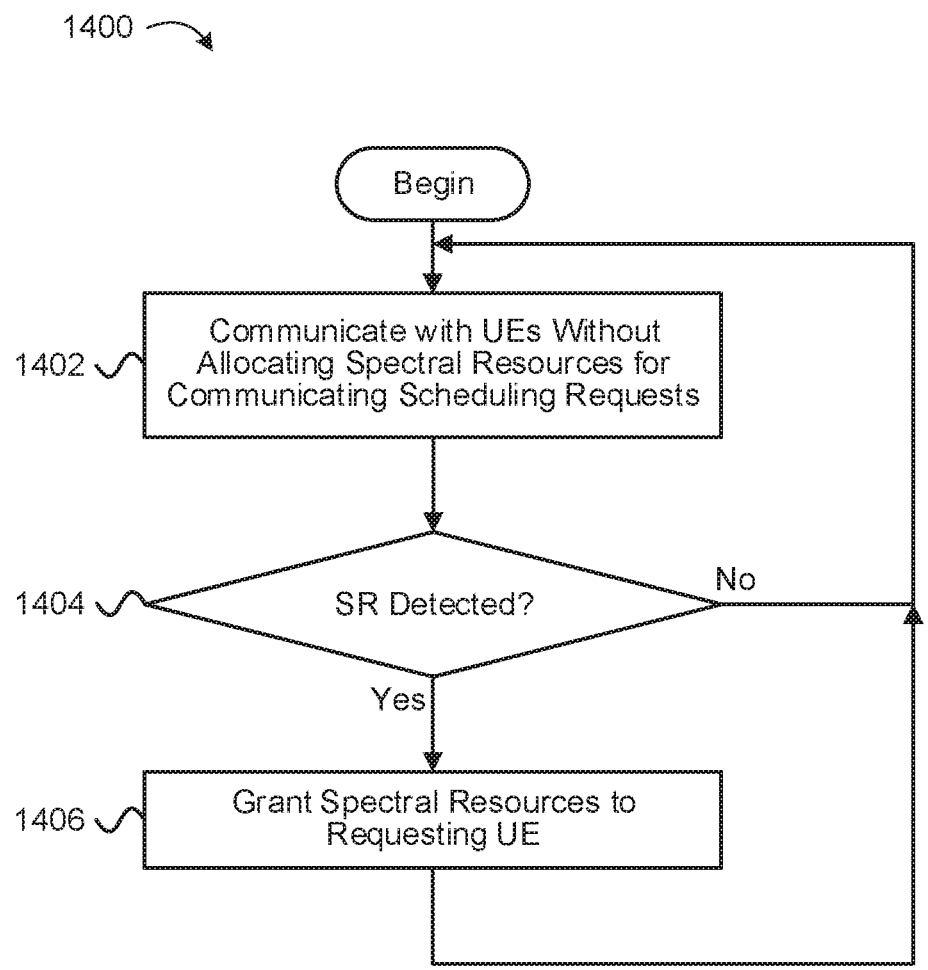
FIG. 14 is a flowchart diagram illustrating one embodiment of a method for wireless communication.

FIG. 14 is a flowchart diagram illustrating one embodiment of a method 1400 for wireless communication. The method 1400 begins, and the primary communication module 202 communicates 1402 with a plurality of UEs 112a-n, without allocating spectral resources to the UEs 112a-n for communicating scheduling requests. The scheduling request detection module 204 determines 1404 whether it detects a scheduling request from a requesting UE (e.g., UE 112a) of the plurality of UEs 112a-n. A scheduling request may include a spread spectrum signal based on a spreading sequence, and may indicate an identity for the requesting UE 112a without indicating information other than the identity. If no scheduling request is detected, the primary communication module 202 continues to communicate 1402 with the UEs 112a-n, and the method 1400 continues. If a scheduling request is detected, the resource grant module 206 grants 1406 spectral resources to the requesting UE (e.g., UE 112a). The primary communication module 202 continues to communicate 1402 with the UEs 112a-n, and the method 1400 continues.

Figure 15:
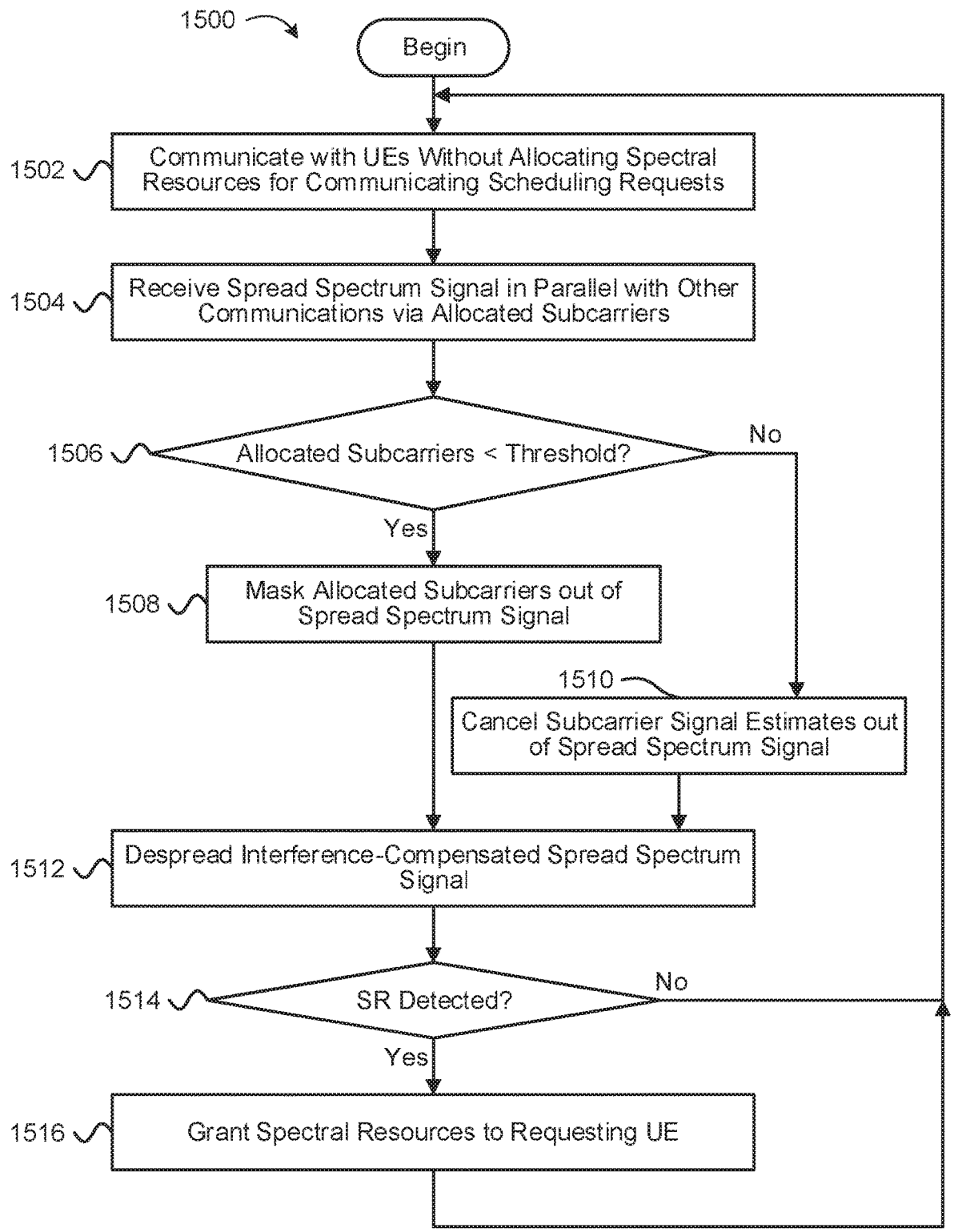
FIG. 15 is a flowchart diagram illustrating another embodiment of a method for wireless communication.

FIG. 15 is a flowchart diagram illustrating another embodiment of a method 1500 for wireless communication. The method 1500 begins, and the primary communication module 202 communicates 1502 with a plurality of UEs 112a-n, without allocating spectral resources to the UEs 112a-n for communicating scheduling requests. The scheduling request detection module 204 receives 1504 a spread spectrum signal in parallel with other communications that the primary communication module 202 participates in with the plurality of UEs 112a-n over allocated subcarrier frequencies. The spread spectrum signal may include scheduling requests from zero or more of the UEs 112a-n. Scheduling requests from different requesting UEs 112 may be based on different spreading sequences that indicate the identities of the requesting UEs 112 without indicating information other than the identities.

The interference compensation module 802 determines 1506 whether the number of allocated or active subcarriers is less than a threshold. If the number of allocated or active subcarriers is less than the threshold, the interference compensation module 802 compensates the spread spectrum signal for interference from communications with the plurality of UEs 112 by using the frequency mask module 804 to mask 1508 allocated subcarrier frequencies out of the spread spectrum signal. If the number of allocated or active subcarriers is greater than or equal to the threshold, the interference compensation module 802 compensates the spread spectrum signal for interference from communications with the plurality of UEs 112 by using the interference cancellation module 806 to cancel 1510 one or more signal estimates for communications with the plurality of UEs 112 (e.g., via the allocated/active subcarriers) out of the spread spectrum signal. In either case, the result is an interference-compensated spread spectrum signal, output by the frequency mask module 804 or the interference cancellation module 806.

The despread module 808 despreads 1512 the interference-compensated spread spectrum signal, and the scheduling request detection module 204 uses the blind detection module 810 and/or the matched detection module 812 to determine 1514 whether it detects a scheduling request from a requesting UE (e.g., UE 112*a*) of the plurality of UEs 112*a*-*n*. If no scheduling request is detected, the primary communication module 202 continues to communicate 1502 with the UEs 112*a*-*n*, and the method 1500 continues. If a scheduling request is detected, the resource grant module 206 grants 1516 spectral resources to the requesting UE(s). The primary communication module 202 continues to communicate 1502 with the UEs 112*a*-*n*, and the method 1500 continues.

In various embodiments, a means for communicating with a plurality of UEs 112 without allocating spectral resources to the UEs 112 for communicating scheduling requests may include a base station 104, one or more transceivers 106, one or more antennas 110, a base station controller 108, a primary communication module 202, other logic hardware and/or other executable code stored on a computer readable storage medium. Other embodiments may include similar or equivalent means for communicating with UEs 112.

In various embodiments, a means for detecting a scheduling request from a requesting UE of the plurality of UEs 112 may include a base station 104, a base station controller 108, a scheduling request detection module 204, an interference compensation module 802, a frequency mask module 804, an interference cancellation module 806, a despread module 808, a blind detection module 810, a matched detection module 812, other logic hardware and/or other executable code stored on a computer readable storage medium. Other embodiments may include similar or equivalent means for detecting a scheduling request.

In various embodiments, a means for granting spectral resources to the requesting UE in response to detecting the scheduling request may include a base station 104, a base station controller 108, a resource grant module 206, other logic hardware and/or other executable code stored on a computer readable storage medium. Other embodiments may include similar or equivalent means for granting spectral resources.

In various embodiments, a means for compensating the spread spectrum signal for interference from communications with the plurality of UEs 112 may include a base station 104, one or more a base station controller 108, a scheduling request detection module 204, an interference compensation module 802, a frequency mask module 804, an interference cancellation module 806, other logic hardware and/or other executable code stored on a computer readable storage medium. Other embodiments may include similar or equivalent means for interference compensation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a base station configured to:
  communicate with a plurality of user equipments (UEs) without allocating spectral resources to the UEs for communicating scheduling requests;
  detect a scheduling request from a requesting UE of the plurality of UEs, the scheduling request comprising a spread spectrum signal based on a spreading sequence, wherein the scheduling request indicates an identity for the requesting UE without indicating information other than the identity, and wherein, as part of detecting the scheduling request, the base station is configured to compensate the spread spectrum signal for interference from communications with the plurality of UEs, by masking a set of frequencies out of the spread spectrum signal, the set of frequencies comprising frequencies allocated by the base station to the plurality of UEs; and
  grant spectral resources to the requesting UE in response to detecting the scheduling request.

2. The apparatus of claim 1, wherein masking the set of frequencies comprises partial masking of frequencies at boundaries between fully masked and fully unmasked frequencies.

3. The apparatus of claim 1, wherein the base station is further configured to detect multiple simultaneous scheduling requests from multiple requesting UEs of the plurality of UEs using multiple spreading sequences, and grant spectral resources to the requesting UEs.

4. The apparatus of claim 1, wherein the base station is configured to grant spectral resources comprising subcarrier frequencies to the plurality of UEs, and to communicate with the plurality of UEs using the granted subcarrier frequencies while receiving the spread spectrum signal, wherein a power level for communicating using the granted subcarrier frequencies above a power level for the spread spectrum signal.

5. The apparatus of claim 1, wherein a power level for the spread spectrum signal is below a noise power level.

6. The apparatus of claim 1, wherein the spreading sequence comprises a Zadoff-Chu sequence with a cyclic offset that identifies the requesting UE.

7. The apparatus of claim 1, wherein the spreading sequence comprises a sum of two or more Zadoff Chu sequences with cyclic offsets that collectively identify the requesting UE.

8. The apparatus of claim 7, wherein the base station is configured to detect the scheduling request by despreading the spread spectrum signal to produce a despread signal, and determining whether a detection threshold is satisfied, based on two or more portions of the despread signal corresponding to the cyclic offsets of the two or more Zadoff-Chu sequences.

9. The apparatus of claim 1, wherein the base station is configured to detect the scheduling request by despreading the spread spectrum signal to produce a despread signal, and determining whether a detection threshold is satisfied based on the despread signal, without using estimates of channel impulse responses for the plurality of UEs.

10. The apparatus of claim 1, wherein the base station is configured to detect the scheduling request by despreading the spread spectrum signal to produce a despread signal, and determining whether a detection threshold is satisfied based on the despread signal and on estimates of channel impulse responses for the plurality of UEs.

11. The apparatus of claim 1, further comprising the requesting UE, wherein the requesting UE is configured to send the scheduling request to the base station by transmitting the spread spectrum signal, without receiving a prior grant of spectral resources for sending the scheduling request.

12. A method comprising:
communicating with a plurality of user equipments (UEs) without allocating spectral resources to the UEs for communicating scheduling requests;
detecting a scheduling request from a requesting UE of the plurality of UEs, the scheduling request comprising a spread spectrum signal based on a spreading sequence, wherein the scheduling request indicates an identity for the requesting UE without indicating information other than the identity, and wherein detecting the scheduling request comprises compensating the spread spectrum signal for interference from communications with the plurality of UEs, by cancelling one or more signal estimates for communications with the plurality of UEs out of the spread spectrum signal; and
granting spectral resources to the requesting UE in response to detecting the scheduling request.

13. An apparatus comprising:
means for communicating with a plurality of user equipments (UEs) without allocating spectral resources to the UEs for communicating scheduling requests;
means for detecting a scheduling request from a requesting UE of the plurality of UEs, the scheduling request comprising a spread spectrum signal based on a spreading sequence, wherein the scheduling request indicates an identity for the requesting UE without indicating information other than the identity, and wherein the means for detecting the scheduling request comprises means for compensating the spread spectrum signal for interference from communications with the plurality of UEs, by masking a set of frequencies out of the spread spectrum signal, the set of frequencies comprising frequencies allocated by a base station to the plurality of UEs; and
means for granting spectral resources to the requesting UE in response to detecting the scheduling request.

* * * * *